United States Patent
Park et al.

(10) Patent No.: US 12,003,456 B2
(45) Date of Patent: Jun. 4, 2024

(54) METHOD FOR PERFORMING UPLINK TRANSMISSION IN WIRELESS COMMUNICATION SYSTEM AND APPARATUS THEREFOR

(71) Applicant: LG ELECTRONICS INC., Seoul (KR)

(72) Inventors: Jonghyun Park, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 628 days.

(21) Appl. No.: 17/266,906

(22) PCT Filed: Aug. 9, 2019

(86) PCT No.: PCT/KR2019/010155
§ 371 (c)(1),
(2) Date: Feb. 8, 2021

(87) PCT Pub. No.: WO2020/032737
PCT Pub. Date: Feb. 13, 2020

(65) Prior Publication Data
US 2021/0320774 A1 Oct. 14, 2021

Related U.S. Application Data

(60) Provisional application No. 62/716,966, filed on Aug. 9, 2018.

(51) Int. Cl.
*H04W 4/00* (2018.01)
*H04L 5/00* (2006.01)
*H04W 72/044* (2023.01)

(52) U.S. Cl.
CPC ......... *H04L 5/0053* (2013.01); *H04W 72/046* (2013.01)

(58) Field of Classification Search
CPC ... H04L 5/0053; H04L 5/0048; H04L 5/0023; H04W 72/046
(Continued)

(56) References Cited

U.S. PATENT DOCUMENTS

2017/0104567 A1 4/2017 Luo et al.
2018/0287682 A1* 10/2018 Kwak .................. H04L 5/0057
(Continued)

OTHER PUBLICATIONS

PCT International Application No. PCT/KR2019/010155, International Search Report dated Dec. 13, 2019, 3 pages.
(Continued)

*Primary Examiner* — Chuong T Ho
(74) *Attorney, Agent, or Firm* — LEE, HONG, DEGERMAN, KANG & WAIMEY

(57) ABSTRACT

The present specification relates to a method for performing uplink transmission in a wireless communication system. More particularly, a method for transmitting, by a terminal, a sounding reference signal (SRS) for beam management in a wireless communication system may comprise the steps of: receiving SRS configuration information configured in units of transmission units for uplink transmission; and transmitting the SRS through a specific transmission unit determined on the basis of the SRS configuration information. The SRS configuration information may include configuration information relating to a reception unit for downlink reception associated with the specific transmission unit.

13 Claims, 20 Drawing Sheets

(58) Field of Classification Search
USPC .................................. 370/329, 330, 328
See application file for complete search history.

(56) References Cited

U.S. PATENT DOCUMENTS

| | | | | |
|---|---|---|---|---|
| 2018/0317123 | A1* | 11/2018 | Chen | H04W 72/21 |
| 2019/0053223 | A1* | 2/2019 | Zhou | H04W 72/21 |
| 2019/0200240 | A1* | 6/2019 | Shi | H04W 52/244 |
| 2019/0268852 | A1* | 8/2019 | Ryu | H04W 74/0833 |
| 2019/0379502 | A1* | 12/2019 | Kakishima | H04B 7/0619 |
| 2020/0068612 | A1* | 2/2020 | Dai | H04W 72/04 |
| 2020/0083939 | A1* | 3/2020 | Park | H04L 5/0051 |
| 2020/0107302 | A1* | 4/2020 | Chen | H04L 1/1896 |
| 2020/0128523 | A1* | 4/2020 | Chen | H04L 27/261 |
| 2020/0137592 | A1* | 4/2020 | Guo | H04W 16/28 |
| 2021/0007060 | A1* | 1/2021 | Chen | H04W 52/42 |
| 2021/0159966 | A1* | 5/2021 | Xi | H04B 7/088 |

OTHER PUBLICATIONS

ZTE, "Remaining issues on beam management," 3GPP TSG RAN WG1 Meeting #93, R1-1805828, May 2018, 7 pages.
Sharp, "Remaining issues on beam management," 3GPP TSG RAN WG2 Meeting #93, R1-1806944, May 2018, 5 pages.
Huawei et al., "Remaining issues on beam management," 3GPP TSG RAN WG1 Meeting #93, R1-1805952, May 2018, 6 pages.
Nokia et al., "Combined TPs on UL non-codebook based transmission," 3GPP TSG RAN WG1 Meeting AH1801, R1-1801179, Jan. 2018, 3 pages.

* cited by examiner

[FIG. 1]
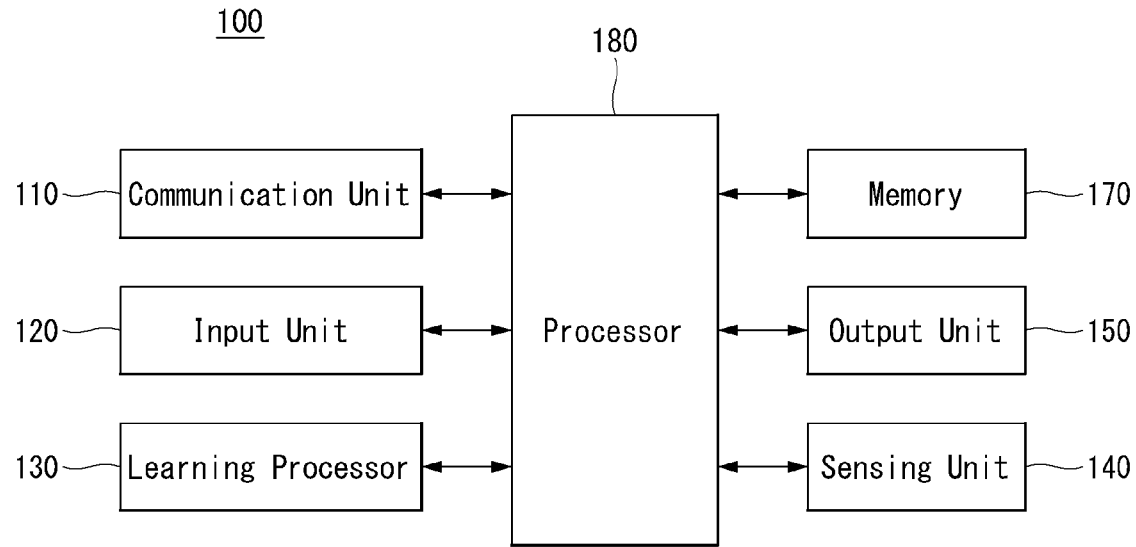
[FIG. 2]
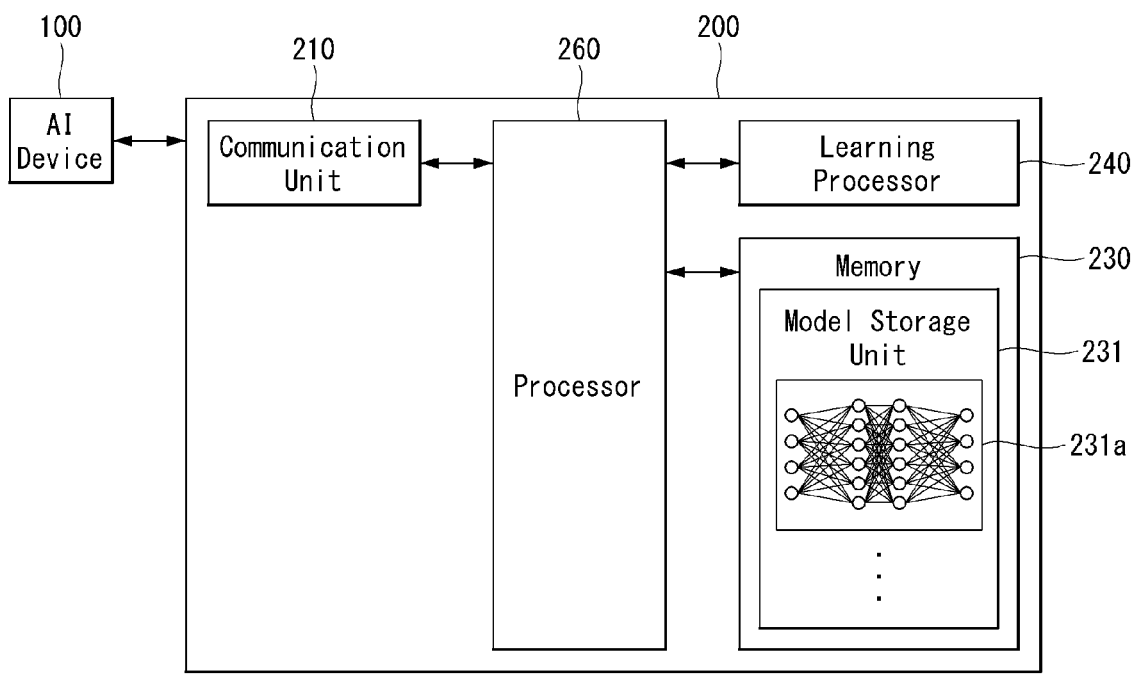

[FIG. 3]
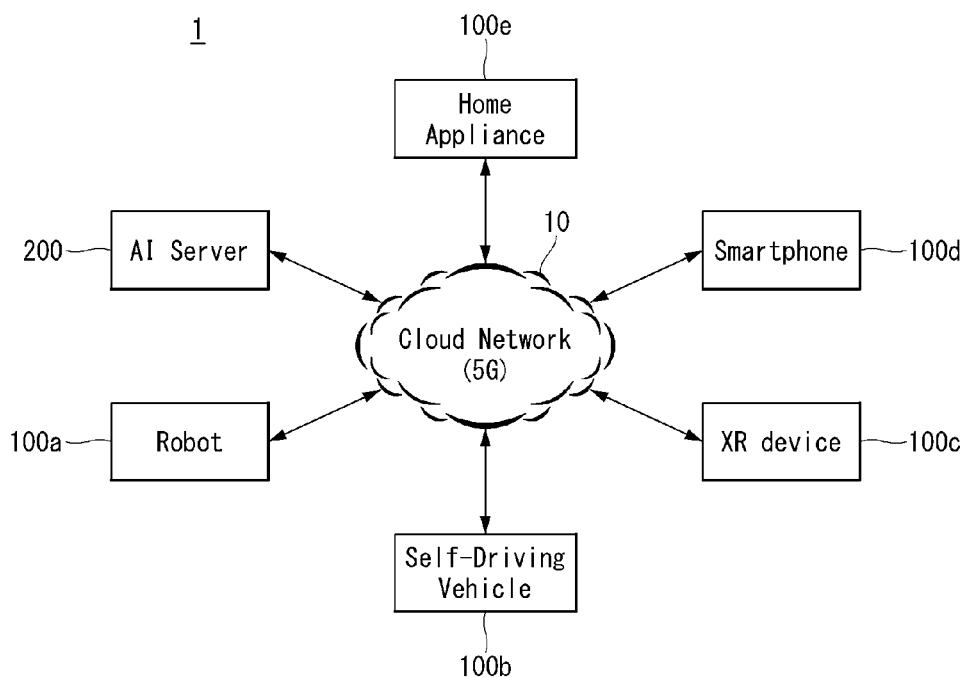

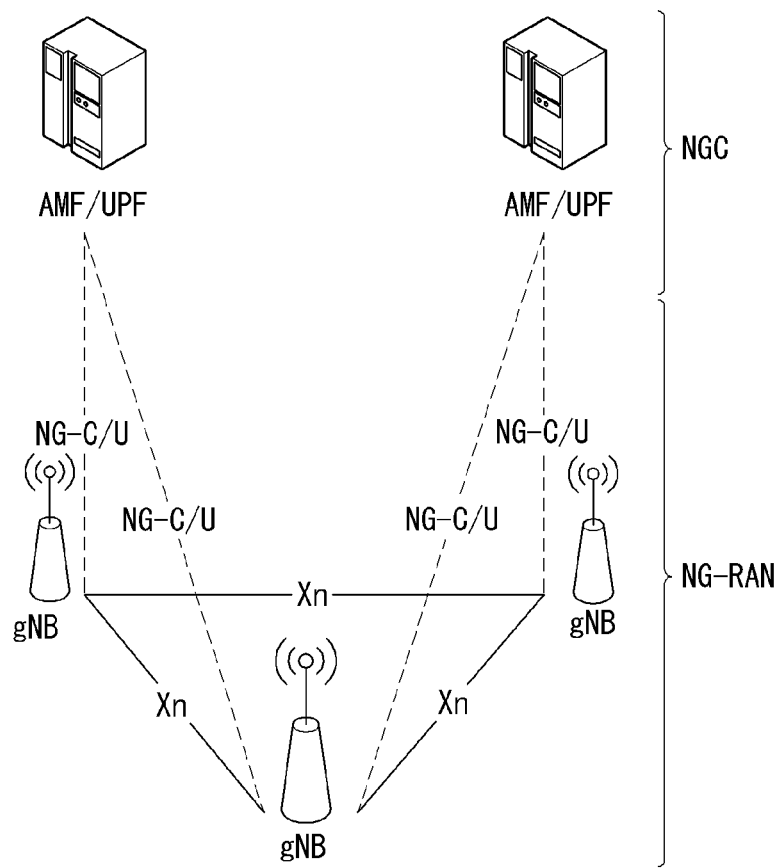
[FIG. 4]

[FIG. 5]
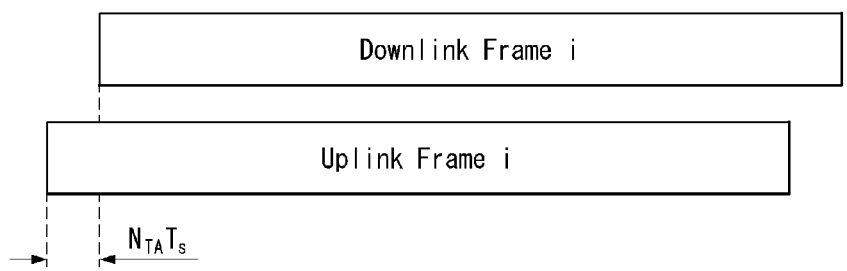

[FIG. 6]
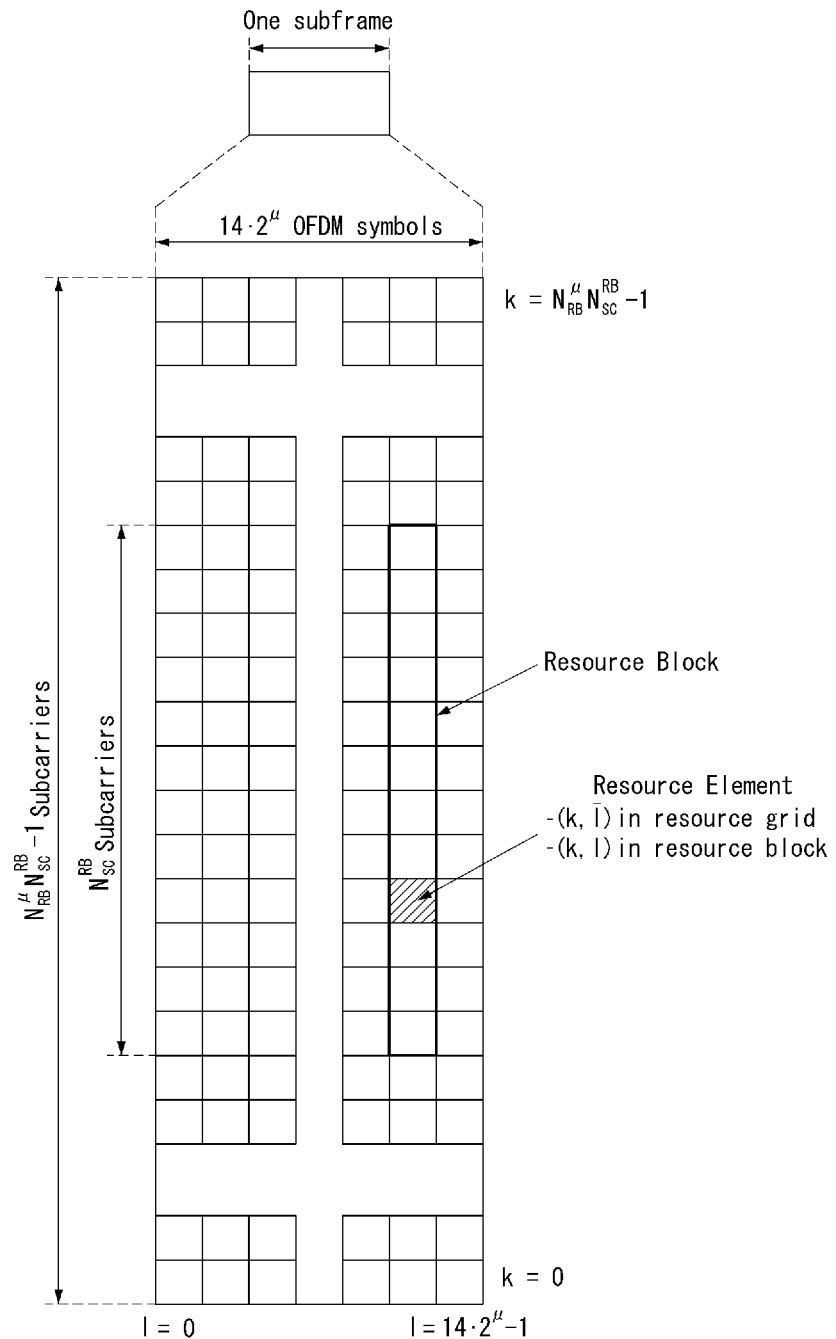

[FIG. 7]
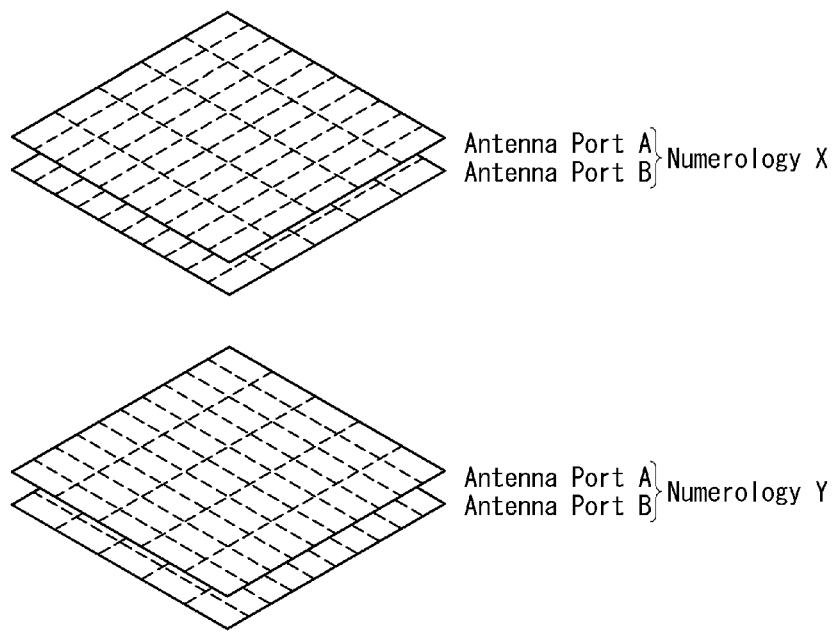

[FIG. 8]
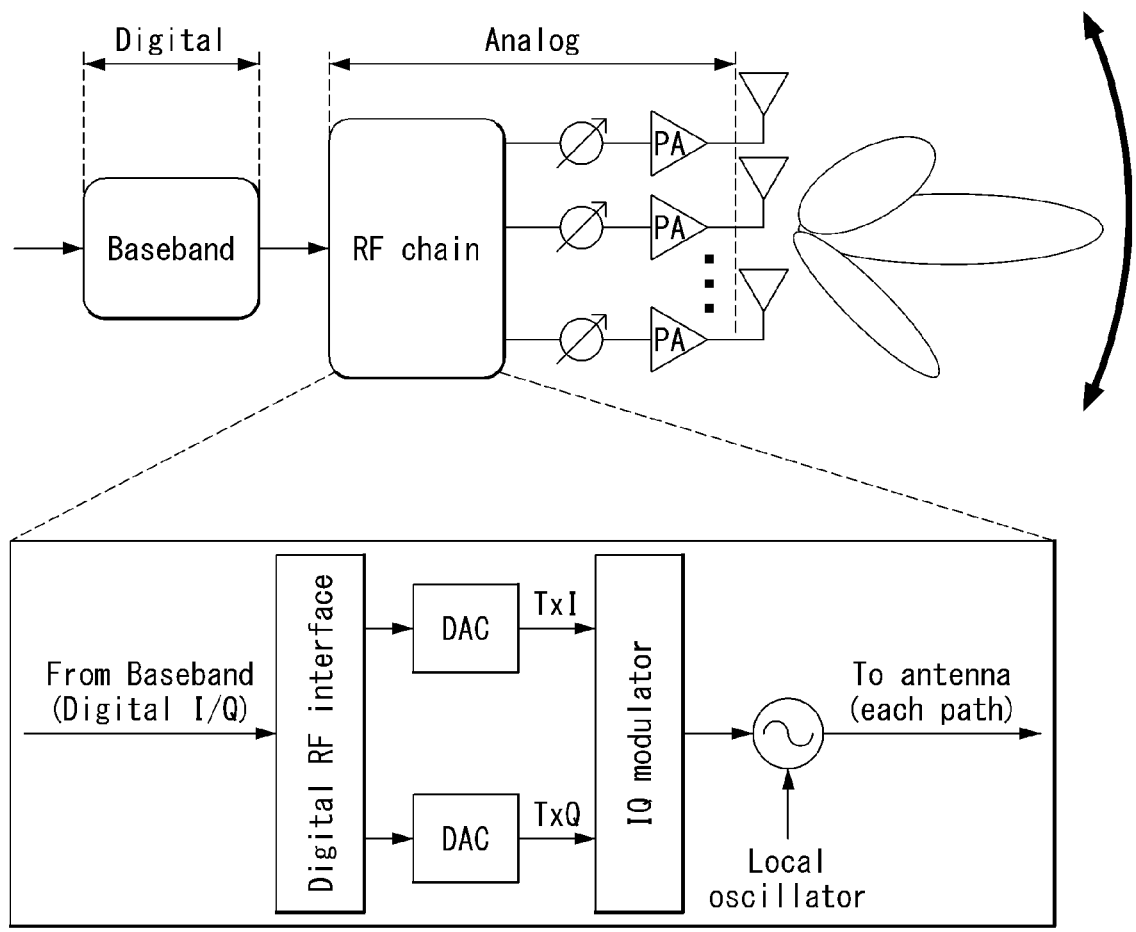

[FIG. 9]
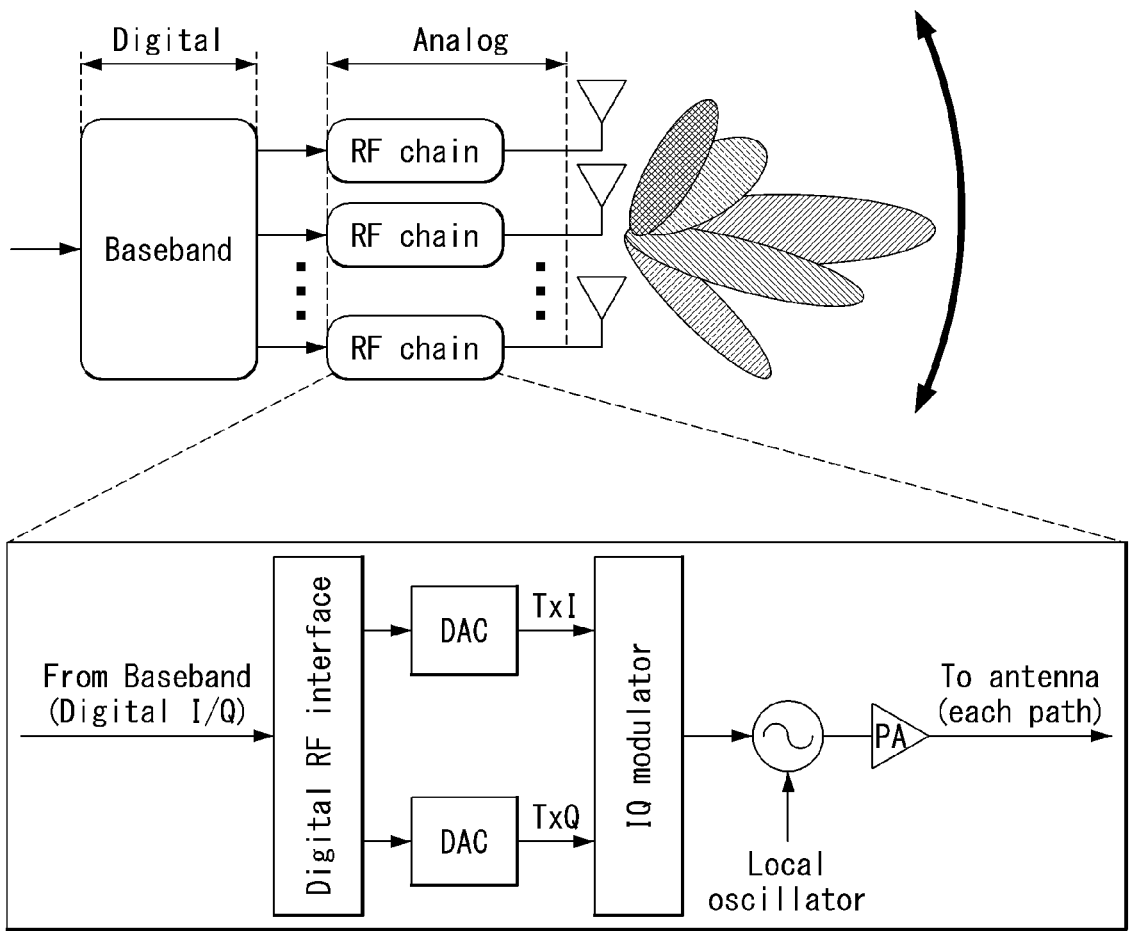

[FIG. 10]
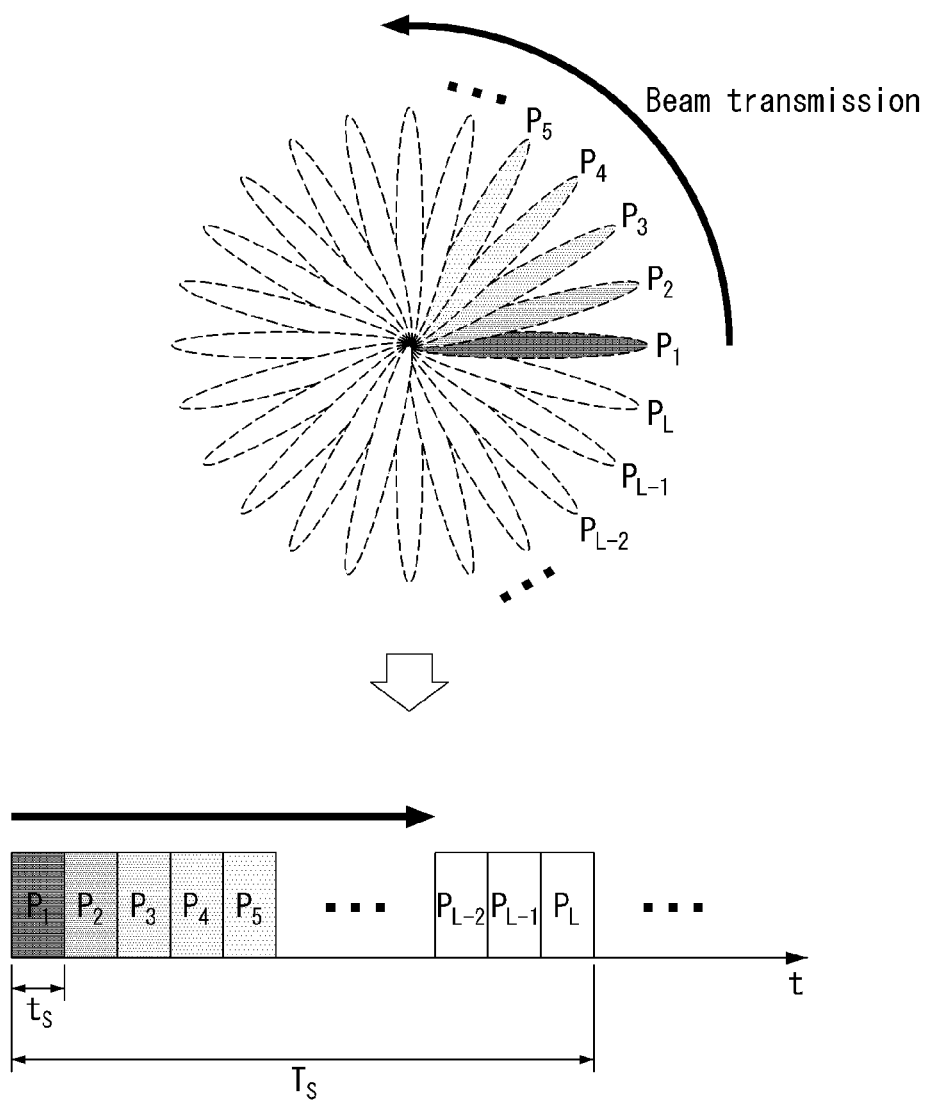

[FIG. 11]
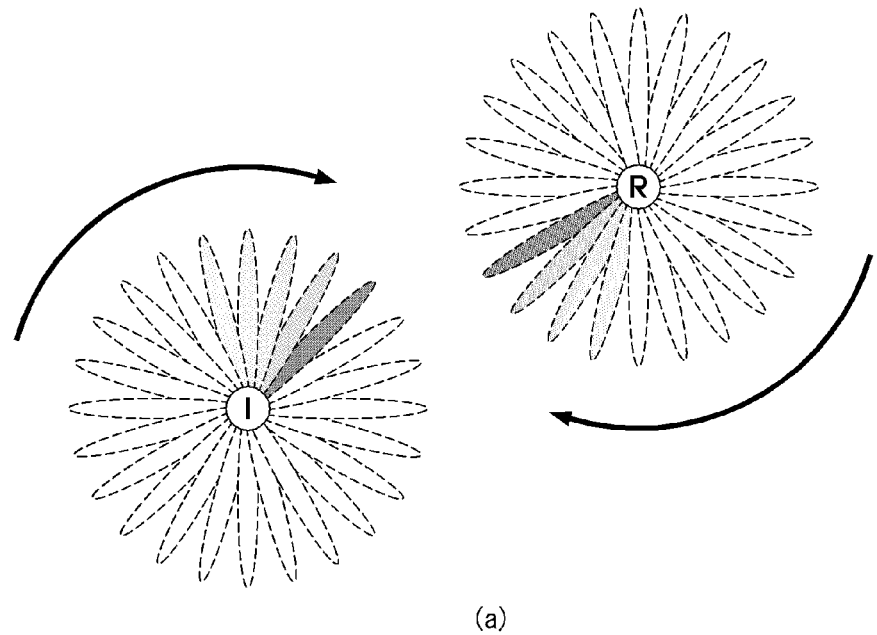
(a)
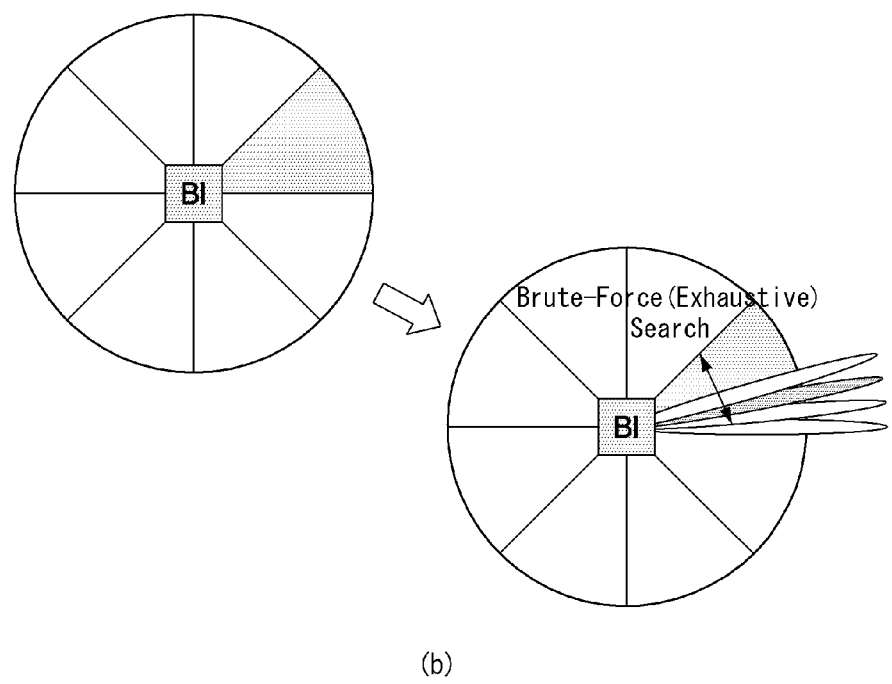
(b)

[FIG. 12]

RACH slot

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| A1 | | A1 | | A1 | | A1 | | A1 | | A1 | | Null | |
| A1 | | A1 | | A1 | | A1 | | A1 | | A1/B1 | | | |
| B1 | | B1 | | B1 | | B1 | | B1 | | B1 | | | |
| A2 | | | | A2 | | | | A2 | | | | Null | |
| A2 | | | | A2 | | | | A2/B2 | | | | | |
| A3 | | | | | | A3 | | | | | | Null | |
| A3 | | | | | | A3/B3 | | | | | | | |
| B4 | | | | | | | | | | | | | |
| C0 | | C0 | | C0 | | C0 | | C0 | | C0 | | | |
| C2 | | | | | | C2 | | | | | | | |

(a) Starting OFDM symbol is '0'

RACH slot

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| | Null | A1 | | A1 | | A1 | | A1 | | A1 | | A1 | |
| | Null | A1 | | A1 | | A1 | | A1 | | A1 | | A1/B1 | |
| | Null | B1 | | B1 | | B1 | | B1 | | B1 | | B1 | |
| | Null | A2 | | | | A2 | | | | A2 | | | |
| | Null | A2 | | | | A2 | | | | A2/B2 | | | |
| | Null | A3 | | | | | | A3 | | | | | |
| | Null | A3 | | | | | | A3/B3 | | | | | |
| | Null | B4 | | | | | | | | | | | |
| | Null | C0 | | C0 | | C0 | | C0 | | C0 | | C0 | |
| | Null | C2 | | | | | | C2 | | | | | |

(b) Starting OFDM symbol is '2'

[FIG. 13]
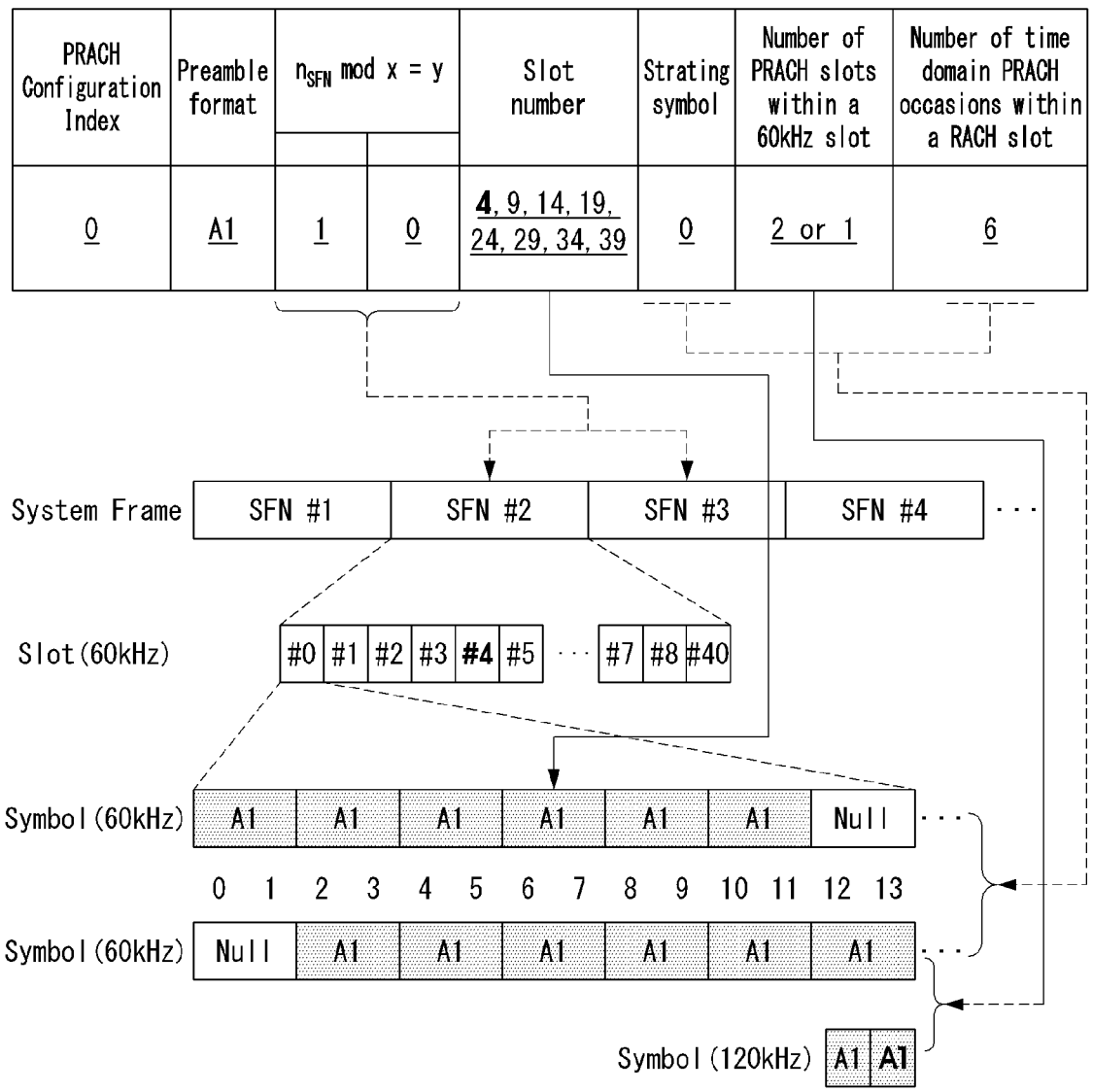

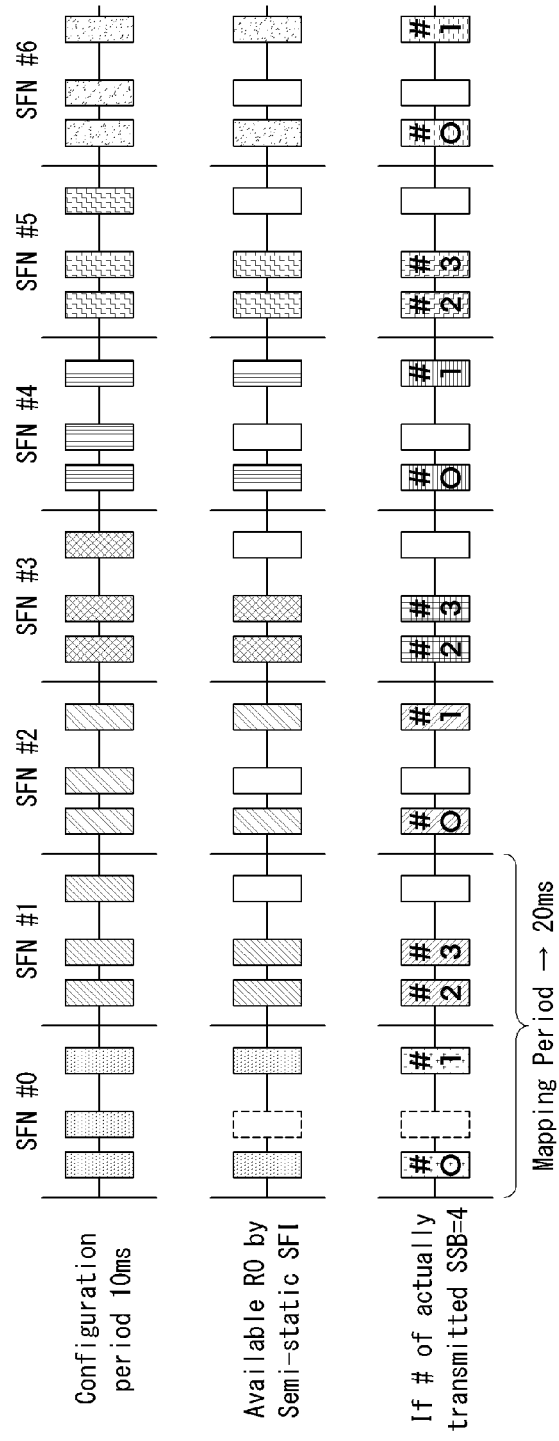
[FIG. 14]

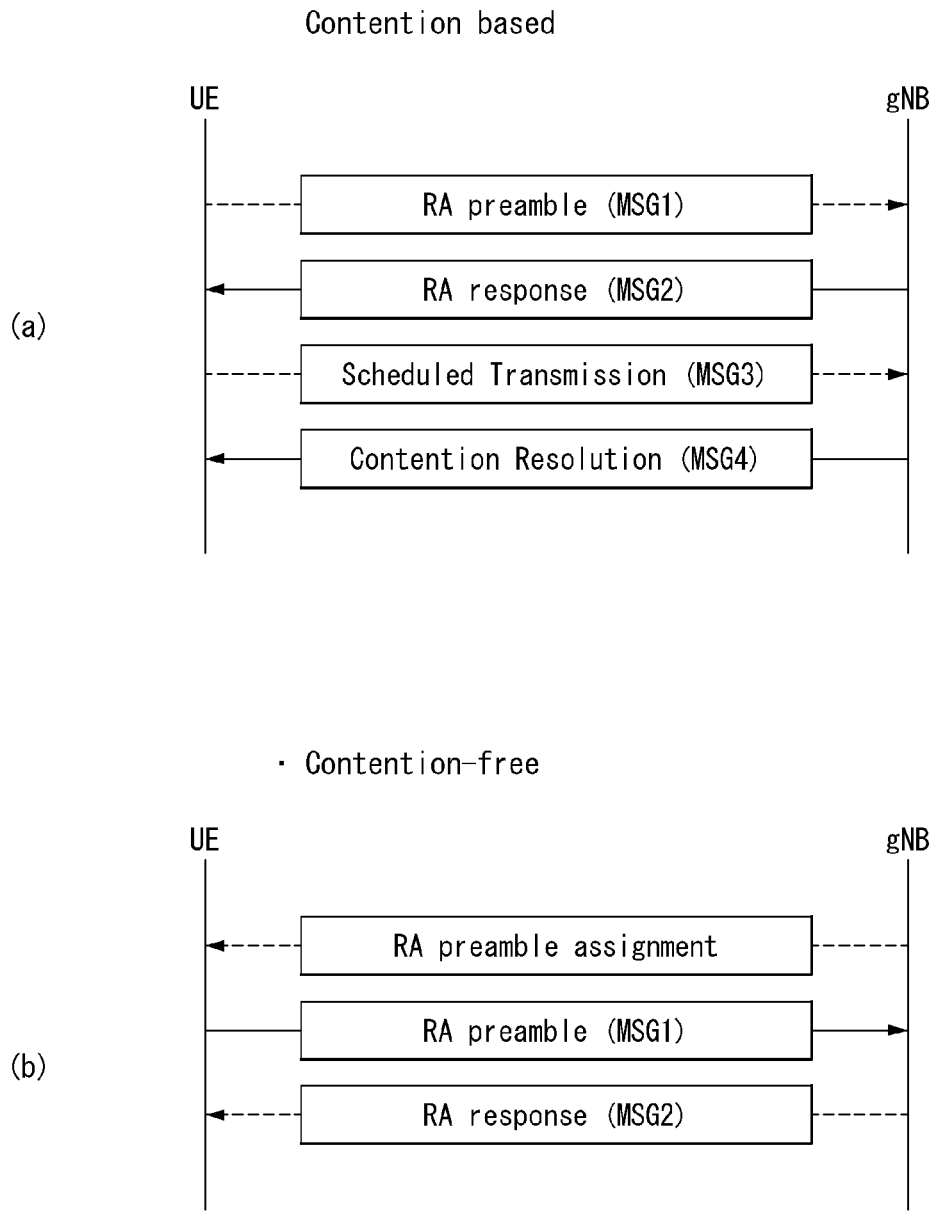

[FIG. 16]
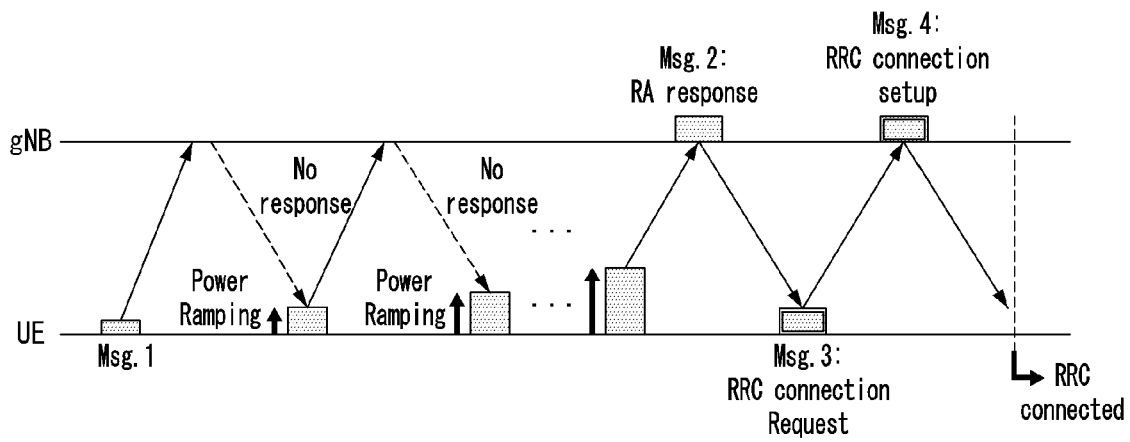
[FIG. 17]
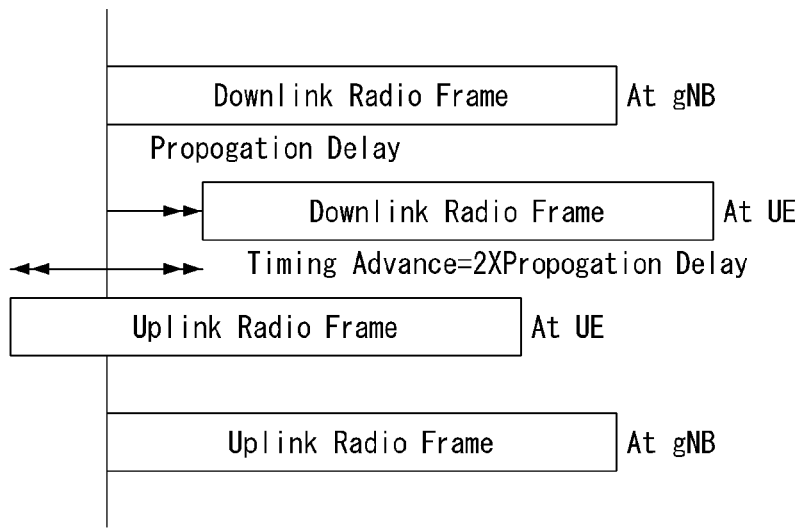

[FIG. 18]
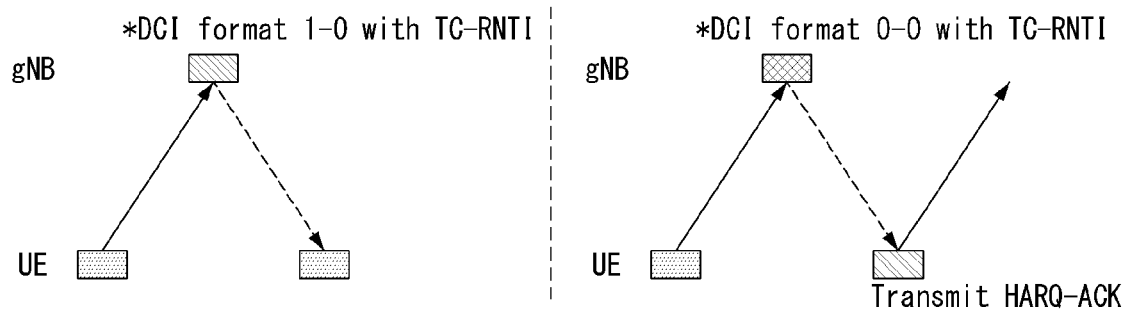
[FIG. 19]
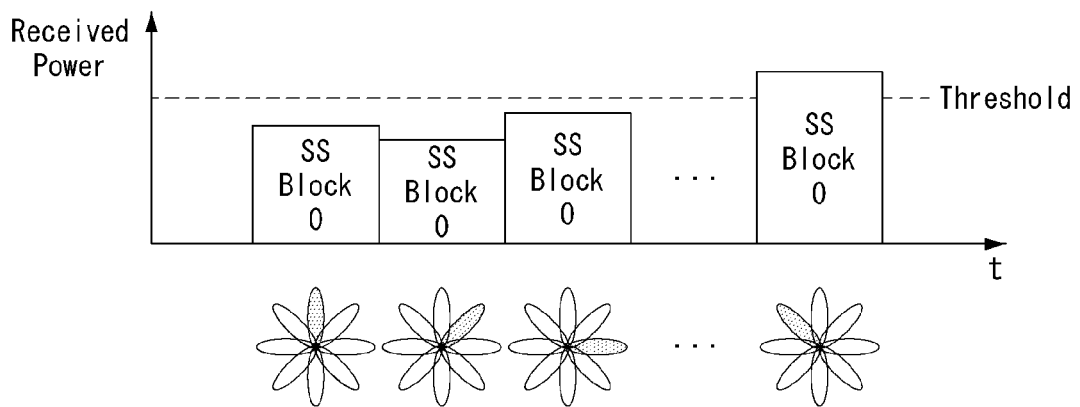
[FIG. 20]
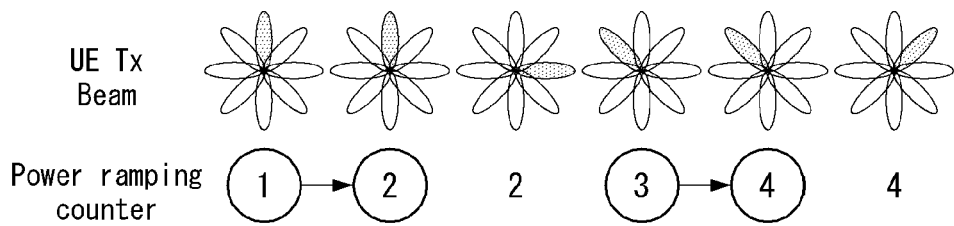

[FIG. 21]
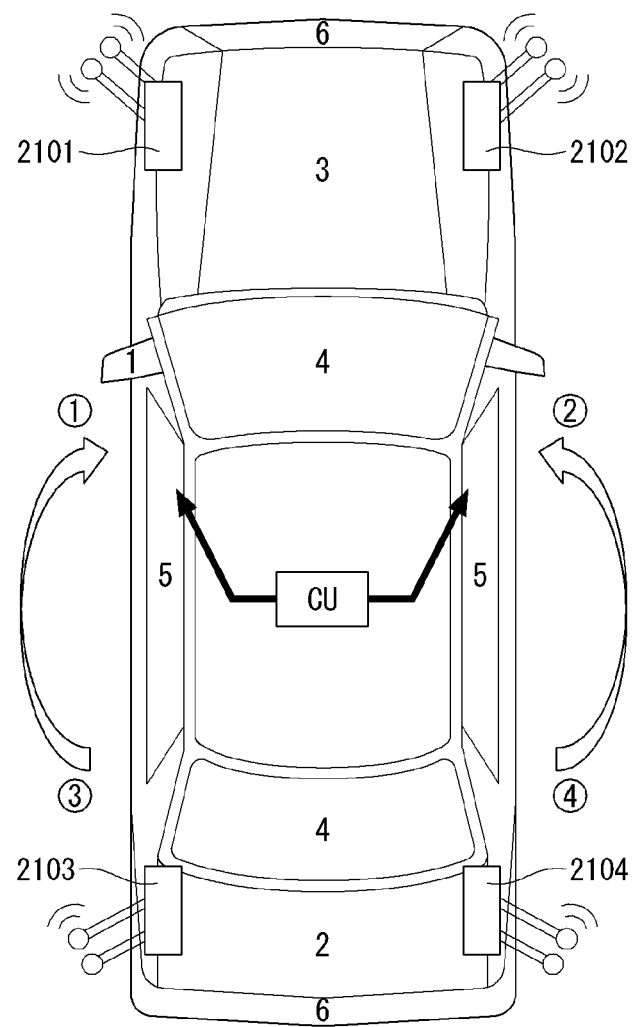

[FIG. 22]
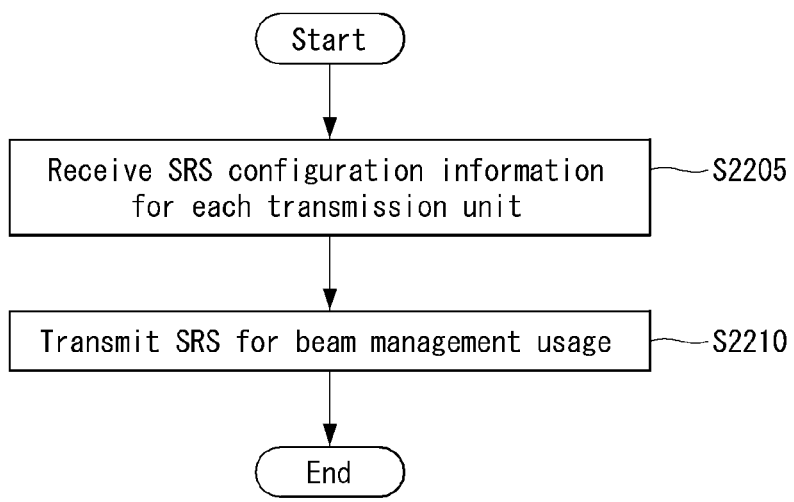
[FIG. 23]
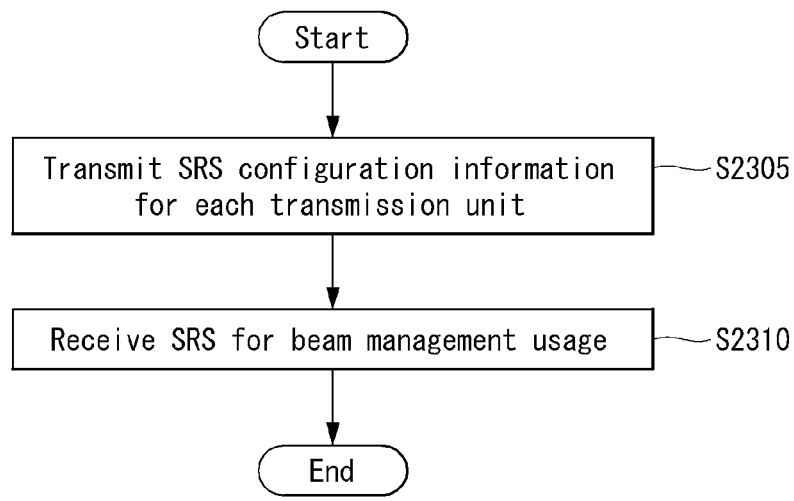

[FIG. 24]
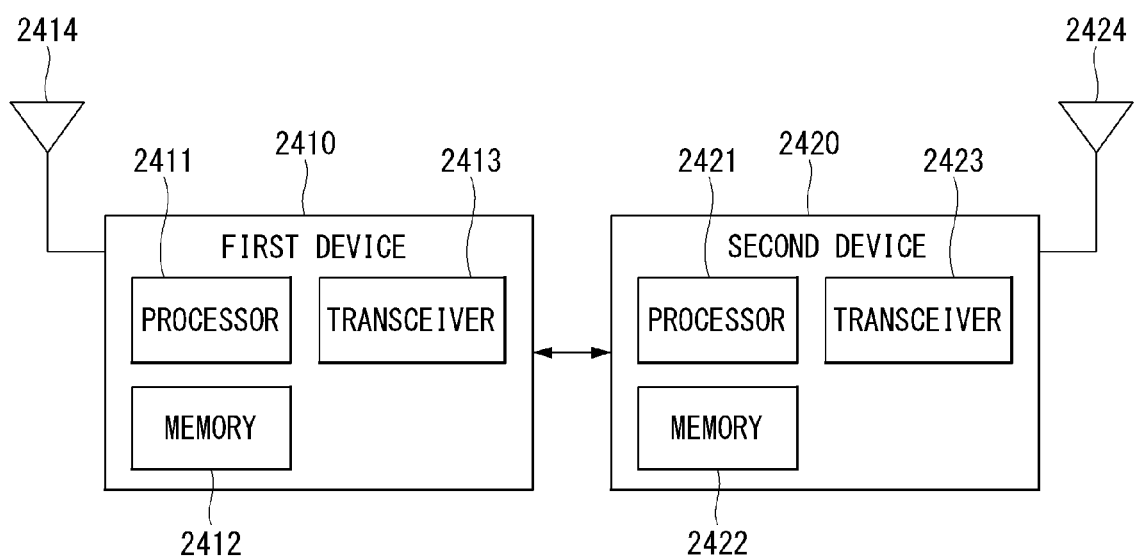

[FIG. 25]
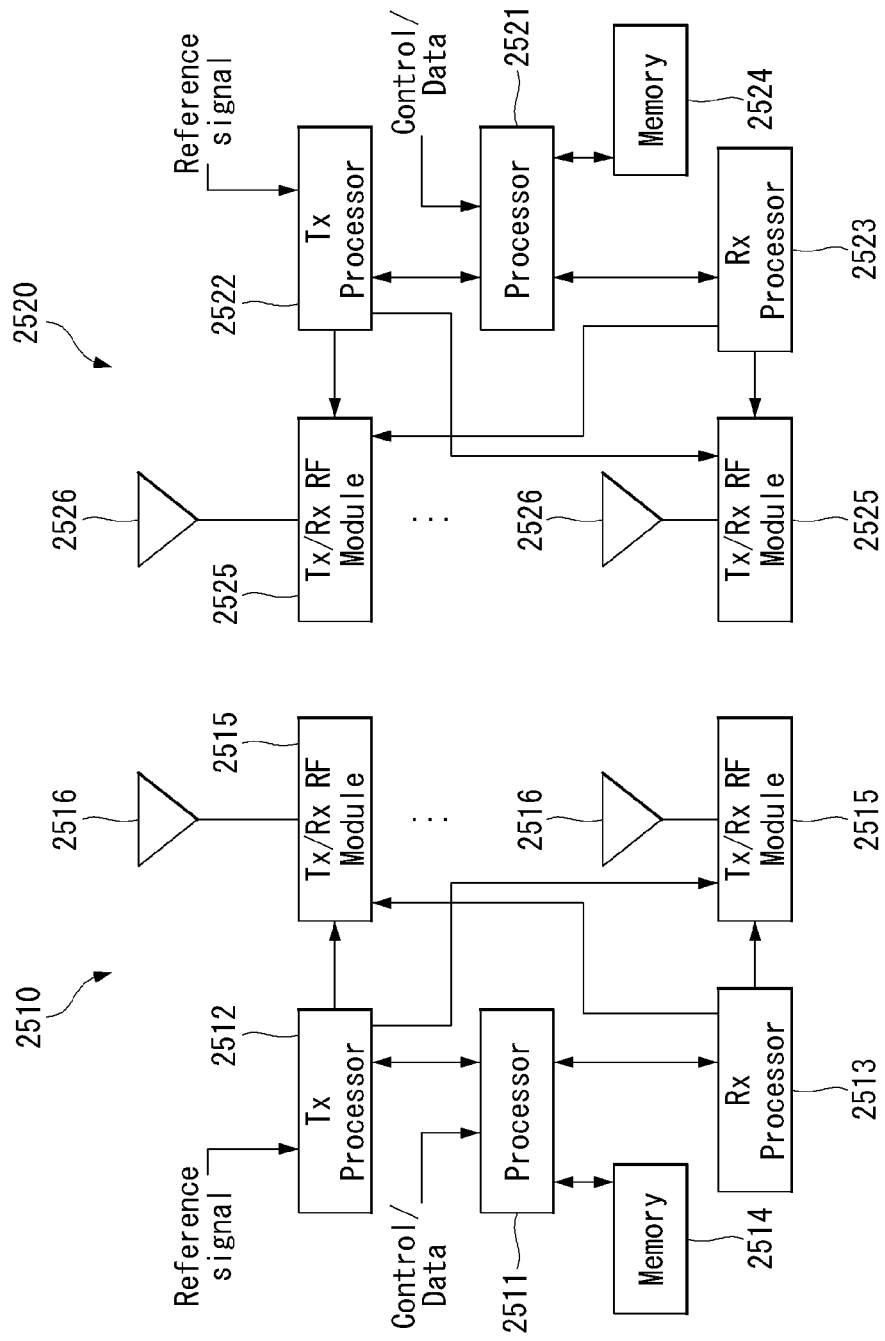

METHOD FOR PERFORMING UPLINK TRANSMISSION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2019/010155, filed on Aug. 9, 2019, which claims the benefit of U.S. Provisional Application No. 62/716,966 filed on Aug. 9, 2018, the contents of which is all incorporated by reference herein in its entirety.

TECHNICAL FIELD

The present disclosure relates to a wireless communication system and, more particularly, to a method for performing uplink transmission and an apparatus supporting the same.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to be able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

An object of the present disclosure is to provide a method of performing uplink transmission by considering a transmission unit (e.g., an uplink synchronization unit (USU), a panel, a beam group, or an antenna group, etc).

In particular, an object of the present disclosure is to provide a method of performing a (local) uplink beam sweeping operation by considering a transmission unit.

Technical problems to be solved by the present disclosure are not limited by the aforementioned technical problems, and other technical problems which are not mentioned above can be clearly understood from the following description by those skilled in the art to which the present disclosure pertains.

Technical Solution

In an embodiment of the present disclosure, a method of transmitting, by a user equipment, a sounding reference signal (SRS) for beam management in a wireless communication system may include receiving SRS configuration information configured in a transmission unit for uplink transmission and transmitting the SRS through a specific transmission unit determined based on the SRS configuration information. In this case, the SRS configuration information may include configuration information for a reception unit for downlink reception associated with the specific transmission unit.

Furthermore, in the method according to an embodiment of the present disclosure, the SRS configuration information may include identification information for the specific transmission unit and/or identification information for the reception unit.

Furthermore, in the method according to an embodiment of the present disclosure, an SRS resource set within the SRS configuration information may be configured for each transmission unit, and identification information of a downlink reference signal may be configured for each SRS resource set.

Furthermore, in the method according to an embodiment of the present disclosure, at least one beam for the transmission of the SRS may be determined based on the identification information of the downlink reference signal.

Furthermore, the method according to an embodiment of the present disclosure further includes receiving information indicating at least one beam for the transmission of the SRS. The information indicating the at least one beam may be at least one of a beam identifier, an SRS resource identifier, a channel state information-reference signal (CSI-RS) resource identifier and/or a synchronization signal block (SSB) identifier.

Furthermore, in the method according to an embodiment of the present disclosure, when two beams are configured by the information indicating the at least one beam, the two beams may be the first beam and the last beam configured for the transmission of the SRS, respectively.

Furthermore, in the method according to an embodiment of the present disclosure, when the SRS is transmitted through multiple beams and multiple SRS resources, different beams may be applied to contiguous SRS resources among the multiple SRS resources.

Furthermore, in the method according to an embodiment of the present disclosure, the multiple SRS resources may be included in one SRS resource set configured for the specific transmission unit.

According to an embodiment of the present disclosure, a user equipment transmitting a sounding reference signal (SRS) for beam management in a wireless communication system may include a radio frequency (RF) module; at least one processor; and at least one computer memory operatively coupled to the at least one processor and configured to store instructions performing operations when executed by the at least one processor. The operations may include receiving SRS configuration information configured in a transmission unit for uplink transmission and transmitting the SRS through a specific transmission unit determined based on the SRS configuration information. Furthermore, the SRS configuration information may include configuration information for a reception unit for downlink reception associated with the specific transmission unit.

Furthermore, in the user equipment according to an embodiment of the present disclosure, the SRS configuration information may include identification information for the specific transmission unit and/or identification information for the reception unit.

Furthermore, in the user equipment according to an embodiment of the present disclosure, an SRS resource set within the SRS configuration information may be configured for each transmission unit, and identification information of a downlink reference signal may be configured for each SRS resource set.

Furthermore, in the user equipment according to an embodiment of the present disclosure, at least one beam for the transmission of the SRS may be determined based on the identification information of the downlink reference signal.

Furthermore, in the user equipment according to an embodiment of the present disclosure, the memory may further store an instruction which enables information indicating at least one beam for the transmission of the SRS to be received. In this case, the information indicating the at least one beam may be at least one of a beam identifier, an SRS resource identifier, a channel state information-reference signal (CSI-RS) resource identifier and/or a synchronization signal block (SSB) identifier.

Furthermore, in the user equipment according to an embodiment of the present disclosure, when two beams are configured by the information indicating the at least one beam, the two beams may be the first beam and the last beam configured for the transmission of the SRS, respectively.

Furthermore, in the user equipment according to an embodiment of the present disclosure, when the SRS is transmitted through multiple beams and multiple SRS resources, different beams may be applied to contiguous SRS resources among the multiple SRS resources.

Advantageous Effects

According to an embodiment of the present disclosure, there is an effect in that an uplink beam sweeping operation of a UE can be guaranteed in transmission and reception between the UE and a base station.

Furthermore, according to an embodiment of the present disclosure, there is an effect in that a base station can control a reception unit (e.g., reception panel) of a UE because the base station configures and/or indicates beam sweeping by considering a transmission unit and/or a reception unit.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 illustrates an AI device according to an embodiment of the present disclosure.

FIG. 2 illustrates an AI server according to an embodiment of the present disclosure.

FIG. 3 illustrates an AI system according to an embodiment of the present disclosure.

FIG. 4 is a diagram illustrating an example of an overall system structure of NR to which a method proposed in the present disclosure may be applied.

FIG. 5 illustrates a relationship between an uplink frame and a downlink frame in a wireless communication system to which a method proposed in the present disclosure may be applied.

FIG. 6 illustrates an example of a resource grid supported by a wireless communication system to which a method proposed in the present disclosure may be applied.

FIG. 7 illustrates examples of a resource grid for each antenna port and numerology to which a method proposed in the present disclosure may be applied.

FIG. 8 shows an example of a block diagram of a transmitter configured with an analog beamformer and RF chains.

FIG. 9 shows an example of a block diagram of a transmitter configured with a digital beamformer and RF chains.

FIG. 10 illustrates an example of an analog beam scanning method.

FIG. 11 is a diagram for a comparison between beam scanning application methods.

FIG. 12 illustrates an example of start OFDM symbols.

FIG. 13 illustrates an example of an RACH configuration table.

FIG. 14 is a diagram illustrating an example of RACH configuration intervals and mapping interval sets.

FIG. 15 is a diagram illustrating an RACH procedure.

FIG. 16 illustrates an example of an overall RACH procedure.

FIG. 17 is a diagram illustrating an example of TA.

FIG. 18 illustrates an example of the retransmission of MSG3 and MSG4 transmission.

FIG. 19 illustrates a threshold concept of an SS block for RACH resource association.

FIG. 20 is a diagram illustrating an example of a change in the power ramping count in an RACH procedure.

FIG. 21 is a diagram illustrating a concept of a USU proposed in the present disclosure.

FIG. 22 illustrates an operational flowchart of a UE which transmits an SRS in a wireless communication system to which a method proposed in the present disclosure may be applied.

FIG. 23 illustrates an operational flowchart of a base station which receives an SRS in a wireless communication system to which a method proposed in the present disclosure may be applied.

FIG. 24 illustrates a wireless communication apparatus to which methods proposed in the present disclosure may be applied according to another embodiment of the present disclosure.

FIG. 25 is another example of a block diagram of a wireless communication apparatus to which methods proposed in the present disclosure may be applied.

MODE FOR INVENTION

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with a terms, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, or a device-to-device (D2D) device.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present disclosure and the use of the specific terms may be modified into other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present disclosure may be based on standard documents disclosed in at least one of IEEE 802, 3GPP, and 3GPP2 which are the wireless access systems. That is, steps or parts which are not described to definitely show the technical spirit of the present disclosure among the embodiments of the present disclosure may be based on the documents. Further, all terms disclosed in the document may be described by the standard document.

3GPP LTE/LTE-A/NR is primarily described for clear description, but technical features of the present disclosure are not limited thereto.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billion. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive occasion in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

The present disclosure described below can be implemented by combining or modifying respective embodiments to meet the aforementioned requirements of 5G.

The following describes in detail technical fields to which the present disclosure described below is applicable.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 illustrates an AI device 100 according to an embodiment of the present disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100e or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™ radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 180 may control at least some of the elements of the AI device 100 in order to execute an application program stored in the memory 170. Moreover, the processor 180 may combine and drive two or more of the elements included in the AI device 100 in order to execute the application program.

FIG. 2 illustrates an AI server 200 according to an embodiment of the present disclosure.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 3 illustrates an AI system 1 according to an embodiment of the present disclosure.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the aforementioned technology is applied are described. In this case, the AI devices 100a to 100e shown in FIG. 3 may be considered to be detailed embodiments of the AI device 100 shown in FIG. 1.

<AI and Robot to which the Methods Proposed in the Present Disclosure May be Applied>

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

AI and Self-Driving to which Methods Proposed in the Present Disclosure May be Applied An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

AI and XR to which the Methods Proposed in the Present Disclosure May be Applied An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI, Robot and Self-Driving to which the Methods Proposed in the Present Disclosure May be Applied An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI, Robot and XR to which the Methods Proposed in the Present Disclosure May be Applied An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI, Self-Driving and XR to which the Methods Proposed in the Present Disclosure May be Applied An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

Definition of Terms eLTE eNB: eLTE eNB is the evolution of an eNB that supports connectivity to the EPC and the NGC.

gNB: A node which supports the NR as well as connectivity to the NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 4 illustrates an example of an overall structure of an NR system to which a method proposed in the present disclosure is applicable.

Referring to FIG. 4, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s=1/(\Delta f_{max}\cdot N_f)$. In this case, $\Delta f_{max}=480\cdot 10^3$, and $N_f=4096$. DL and UL transmission is configured as a radio frame having a section of $T_f=(\Delta f_{max}N_f/100)\cdot T_s=10$ ms. The radio frame is composed of ten subframes each having a section of $T_{sf}=(\Delta f_{max}N_f/1000)\cdot T_s=1$ ms. In this case, there may be a set of UL frames and a set of DL frames.

FIG. 5 illustrates a relation between an uplink frame and a downlink frame in a wireless communication system to which a method proposed in the present disclosure is applicable.

As illustrated in FIG. 5, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 2 illustrates the number of OFDM symbols per slot for a normal CP in the numerology μ, and Table 3 illustrates the number of OFDM symbols per slot for an extended CP in the numerology μ.

Table 2 represents the number $N_{symb}^{slot}$ of OFDM symbols per slot, the number $N_{slot}^{frame, \mu}$ of slots per radio frame, and the number $N_{slot}^{subframe,\mu}$ of slots per subframe in a normal CP. Table 3 represents the number of OFDM symbols per slot, the number of slots per radio frame, and the number of slots per subframe in an extended CP.

TABLE 2

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame, \mu}$ | $N_{slot}^{subframe, \mu}$ |
|---|---|---|---|
| 2 | 12 | 40 | 4 |

NR Physical Resource

In relation to physical resources in the NR system, an antenna port, a resource grid, a resource element, a resource block, a carrier part, etc., may be considered.

Hereinafter, the above physical resources that may be considered in the NR system are described in more detail.

First, in relation to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

FIG. 6 illustrates an example of a resource grid supported in a wireless communication system to which a method proposed in the present disclosure is applicable.

Referring to FIG. 6, a resource grid consists of $N_{RB}^\mu N_{sc}^{RB}$ subcarriers on a frequency domain, each subframe consisting of $14 \cdot 2^\mu$ OFDM symbols, but the disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

In this case, as illustrated in FIG. 7, one resource grid may be configured per numerology μ and antenna port p.

FIG. 7 illustrates examples of a resource grid per antenna port and numerology to which a method proposed in the present disclosure is applicable.

Each element of the resource grid for the numerology μ and the antenna port p is called a resource element and is uniquely identified by an index pair (k,l), where $k=0, \ldots, N_{RB}^\mu N_{sc}^{RB}-1$ is an index on a frequency domain, and $l=0, \ldots, 2^\mu N_{symb}^{(\mu)}-1$ refers to a location of a symbol in a subframe. The index pair (k,l) is used to refer to a resource element in a slot, where $l=0, \ldots, N_{symb}^\mu -1$.

The resource element (k,l) for the numerology μ and the antenna port p corresponds to a complex value $a_{k,l}^{(p,\mu)}$. When there is no risk for confusion or when a specific antenna port or numerology is not specified, the indexes p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^\mu$ in the frequency domain and resource elements (k, l) for the subcarrier spacing configuration μ may be given by the following Equation 1.

$$n_{CRB}^\mu = \left\lfloor \frac{k}{N_{sc}^{RB}} \right\rfloor \quad \text{[Equation 1]}$$

wherein k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

wherein $N_{BWP,i}^{start}$ may be the common resource block where the BWP starts relative to the common resource block 0.

Uplink Control Channel

Physical uplink control signaling should be able to carry at least hybrid-ARQ acknowledgements, CSI reports (possibly including beamforming information), and scheduling requests.

At least two transmission methods are supported for an UL control channel supported in an NR system.

The UL control channel can be transmitted in short duration around last transmitted UL symbol(s) of a slot. In this case, the UL control channel is time-division-multiplexed and/or frequency-division-multiplexed with an UL data channel within a slot. For the UL control channel in short duration, transmission over one symbol duration of a slot is supported.

- Short uplink control information (UCI) and data are frequency-division-multiplexed both within a UE and between UEs, at least for the case where physical resource blocks (PRBs) for short UCI and data do not overlap.
- In order to support time division multiplexing (TDM) of a short PUCCH from different UEs in the same slot, a mechanism is supported to inform the UE of whether or not symbol(s) in a slot to transmit the short PUCCH is supported at least above 6 GHz.
- At least following is supported for the PUCCH in 1-symbol duration: 1) UCI and a reference signal (RS) are multiplexed in a given OFDM symbol in a frequency division multiplexing (FDM) manner if the RS is multiplexed, and 2) there is the same subcarrier spacing between downlink (DL)/uplink (UL) data and PUCCH in short-duration in the same slot.
- At least one PUCCH in short-duration spanning 2-symbol duration of a slot is supported. In this instance, there is the same subcarrier spacing between DL/UL data and the PUCCH in short-duration in the same slot.
- At least semi-static configuration, in which a PUCCH resource of a given UE within a slot. i.e., short PUCCHs of different UEs can be time-division multiplexed within a given duration in a slot, is supported.
- The PUCCH resource includes a time domain, a frequency domain, and when applicable, a code domain.
- The PUCCH in short-duration can span until an end of a slot from UE perspective. In this instance, no explicit gap symbol is necessary after the PUCCH in short-duration.
- For a slot (i.e., DL-centric slot) having a short UL part, 'short UCI' and data can be frequency-division multiplexed by one UE if data is scheduled on the short UL part.

The UL control channel can be transmitted in long duration over multiple UL symbols so as to improve coverage. In this case, the UL control channel is frequency-division-multiplexed with the UL data channel within a slot.

- UCI carried by a long duration UL control channel at least with a low peak to average power ratio (PAPR) design can be transmitted in one slot or multiple slots.
- Transmission across multiple slots is allowed for a total duration (e.g. 1 ms) for at least some cases.
- In the case of the long duration UL control channel, the TDM between the RS and the UCI is supported for DFT-S-OFDM.
- A long UL part of a slot can be used for transmission of PUCCH in long-duration. That is, the PUCCH in long-duration is supported for both a UL-only slot and a slot having the variable number of symbols comprised of a minimum of 4 symbols.
- For at least 1 or 2 UCI bits, the UCI can be repeated within N slots (N>1), and the N slots may be adjacent or may not be adjacent in slots where PUCCH in long-duration is allowed.
- Simultaneous transmission of PUSCH and PUCCH for at least the long PUCCH is supported. That is, uplink control on PUCCH resources is transmitted even in the case of the presence of data. In addition to the simultaneous PUCCH-PUSCH transmission, UCI on the PUSCH is supported.
- Intra-TTI slot frequency-hopping is supported.
- DFT-s-OFDM waveform is supported.
- Transmit antenna diversity is supported.

Both TDM and FDM between short duration PUCCH and long duration PUCCH are supported at least for different UEs in one slot. In a frequency domain, a PRB (or multiple PRBs) is a minimum resource unit size for the UL control channel. If hopping is used, a frequency resource and the hopping may not spread over a carrier bandwidth. Further, a UE-specific RS is used for NR-PUCCH transmission. A set of PUCCH resources is configured by higher layer signaling, and a PUCCH resource within the configured set is indicated by downlink control information (DCI).

As part of the DCI, it should be possible to dynamically indicate (at least in combination with RRC) the timing between data reception and hybrid-ARQ acknowledgement transmission. A combination of the semi-static configuration and (for at least some types of UCI information) dynamic signaling is used to determine the PUCCH resource for both 'long and short PUCCH formats'. Here, the PUCCH resource includes a time domain, a frequency domain, and when applicable, a code domain. The UCI on the PUSCH, i.e., using some of the scheduled resources for the UCI is supported in case of simultaneous transmission of UCI and data.

At least UL transmission of at least single HARQ-ACK bit is supported. A mechanism enabling the frequency diversity is supported. In case of ultra-reliable and low-latency communication (URLLC), a time interval between scheduling request (SR) resources configured for a UE can be less than a slot.

Hybrid Beamforming

The existing beamforming technology using multiple antennas may be divided into an analog beamforming scheme and a digital beamforming scheme depending on the location where a beamforming weight vector/precoding vector is applied.

The analog beamforming scheme is a beamforming scheme applied to an initial multiple antenna structure. This may mean a scheme for branching an analog signal on which digital signal processing has been completed into a plurality of paths and forming a beam by applying a phase shift (PS) and power amplifier (PA) configuration to each path.

For analog beamforming, there is a need for a structure in which the PA and PS connected to each antenna process an analog signal derived from one digital signal. In other words, the PA and PS of an analog stage process a complex weight.

FIG. 8 shows an example of a block diagram of a transmitter configured with an analog beamformer and RF chains. FIG. 8 is merely for convenience of description and does not limit the range of the present disclosure.

In FIG. 8, the RF chain means a processing block in which a baseband (BB) signal is converted into an analog signal. In the analog beamforming scheme, the accuracy of a beam is determined depending on the characteristics of a PA and PS. The analog beamforming scheme may be advantageous in narrowband transmission in terms of control of the devices.

Furthermore, the analog beamforming scheme has a relatively small multiplexing gain for a transfer rate increase because it is configured with a hardware structure that is difficult to implement multiple stream transmission. Furthermore, in this case, beamforming for each orthogonal resource allocation-based terminal may not be easy.

In contrast, in the digital beamforming scheme, in order to maximize diversity and a multiplexing gain in a MIMO environment, beamforming is performed in a digital stage using a baseband (BB) process.

FIG. 9 shows an example of a block diagram of a transmitter configured with a digital beamformer and RF chains. FIG. 9 is merely for convenience of description and does not limit the range of the present disclosure.

In the case of FIG. 9, beamforming may be performed as precoding is performed in a BB process. In this case, an RF chain includes a PA. The reason for this is that in the digital beamforming scheme, a complex weight derived for beamforming is directly applied to transmission data.

Furthermore, multiple user beamforming may be supported at the same time because different beamforming may be performed for each terminal. Furthermore, the flexibility of scheduling is improved because independent beamforming is possible for each terminal to which an orthogonal resource has been allocated. Accordingly, an operation of a transmitter complying with a system object is possible. Furthermore, in the environment in which wideband transmission is supported, if a technology, such as MIMO-OFDM, is applied, an independent beam may be formed for each subcarrier.

Accordingly, the digital beamforming scheme can maximize a maximum transfer rate of one terminal (or user) based on a capacity increase of a system and an enhanced beam gain. In the existing 3G/4G (e.g., LTE(-A)) system, the digital beamforming-based MIMO scheme has been introduced based on characteristics, such as those described above.

In an NR system, a massive MIMO environment in which transmission and reception antenna greatly increases may be taken into consideration. In general, in cellular communication, a maximum of transmission and reception antennas applied to the MIMO environment is assumed to be 8. However, as a massive MIMO environment is taken into consideration, the number of transmission and reception antennas may be increased to tens of or hundreds of transmission and reception antennas.

In this case, in the massive MIMO environment, if the aforementioned digital beamforming technology is applied, a transmitter needs to perform signal processing on hundreds of antennas through a BB process for digital signal processing. Accordingly, the complexity of the signal processing may be greatly increased, and the complexity of a hardware implementation may be greatly increased because RF chains corresponding to the number of antennas are necessary.

Furthermore, the transmitter requires independent channel estimation for all the antennas. Furthermore, in the case of the FDD system, pilot and/or feedback overhead may excessively increase because the transmitter requires feedback information for massive MIMO channels configured with all the antennas.

However, if the aforementioned analog beamforming technology is applied in the massive MIMO environment, hardware complexity of the transmitter is relatively low.

In contrast, an increment of performance using multiple antennas is very small, and the flexibility of resource allocation may be reduced. In particular, upon wideband transmission, to control a beam for each frequency is not easy.

Accordingly, in the massive MIMO environment, only one of the analog beamforming and digital beamforming schemes is not exclusively selected, but a hybrid type transmitter configuration method in which analog beamforming and digital beamforming structures have been combined is necessary.

Analog Beam Scanning

In general, analog beamforming may be used in a pure analog beamforming transmitter and receiver and a hybrid beamforming transmitter and receiver. In this case, analog beam scanning may perform estimation on one beam at the same time. Accordingly, a beam training time necessary for beam scanning is proportional to a total number of candidate beams.

As described above, in the case of analog beamforming, a beam scanning process in the time domain is essentially necessary for transmitter and receiver beam estimation. In this case, an estimation time Ts for all transmission and reception beams may be represented like Equation 3.

$$T_S = t_s \times (K_T \times K_R) \qquad \text{[Equation 3]}$$

In Equation 3, is means a time necessary for one beam scanning, $K_T$ means the number of transmission beams, and $K_R$ means the number of reception beams.

FIG. 10 shows examples of analog beam scanning methods.

In the case of FIG. 10, it is assumed that a total number of transmission beams $K_T$ is L and a total number of reception beams $K_R$ is 1. In this case, a total number of candidate beams is L, and thus an L time interval is necessary in the time domain.

In other words, for analog beam estimation, only one beam estimation may be performed in one time interval. As shown in FIG. 10, an L time interval is necessary to perform all L beams ($P_1$ to $P_L$) estimation. After an analog beam estimation procedure is terminated, a terminal feeds the identification (e.g., ID) of a beam having the highest signal intensity back to a base station. That is, a longer training time may be necessary as the number of beams increases according to an increase in the number of transmission and reception antennas.

In analog beamforming, a training interval for an individual beam needs to be guaranteed unlike in digital beamforming because the size of a continuous waveform in a time domain and a phase angle are changed after a digital-to-analog converter (DAC). Accordingly, as the length of the training interval increases, efficiency of a system may be reduced (i.e., a loss of a system may be increased).

FIG. 11 is a diagram for a comparison between beam scanning application methods. FIG. 11(a) is an Exaustive search method, and FIG. 11(b) is a multi-level search method.

The number of search spaces (The No. of search space) of the Exaustive search method is shown in Table 4 below.

TABLE 4

|    | Beam-width: 1° | Beam-width: 5° | Beam-width: 10° |
|----|----------------|----------------|-----------------|
| 2D | 360            | 72             | 36              |
| 3D | 129,600        | 5,184          | 1,296           |

The number of search spaces of the multi-level search method is shown in Table 5 below.

TABLE 5

| | Beam-width: 1° | | Beam-width: 10° | |
|---|---|---|---|---|
| | Coarse beam | Fine beam | Coarse beam | Fine beam |
| 2D | 8 | 45 | 8 | 4.5 |
| 3D | 64 | 2,025 | 64 | 20.25 |

In relation to feedback, in the Exhaustive search method, the ID of the best transmission beam (Best Tx beam ID) is fed back. In the multi-level search method, the ID of the best sector beam (Best Sector beam ID) is fed back with respect to a Coarse beam, and the ID of the best fine beam (Best fine beam ID) is fed back with respect to a fine beam.

In relation to current industrial and standards, there is no related standard for the Exaustive search method, and 802.15.3c and 802.11 ad are present for the multi-level search method.

In relation to the beam scanning, more detailed contents are described in [1] J. Wang, Z. Lan, "Beam codebook based beamforming protocol for multi-Gbps millimeter-wave WPAN systems," IEEE J. Select. Areas in Commun., vol. 27, no. 8 [2] J. Kim, A. F. Molisch, "Adaptive Millimeter-Wave Beam Training for Fast Link Configuration," USC CSI's 30th conference [3] T. Nitsche, "Blind Beam Steering: Removing 60 GHz Beam Steering Overhead."

Reference Signals in NR

Downlink (DL) physical layer signals of the 3GPP NR system are as follows. More detailed description refers to 3GPP TS 38.211 and TS 38.214.
  CSI-RS: signal for DL channel state information (CSI) acquisition and DL beam measurement
  Tracking RS (TRS): signal for fine time/frequency tracking of the UE
  DL DMRS: RS for PDSCH demodulation
  DL phase-tracking RS (PT-RS): RS transmitting for phase noise compensation of the UE
  Synchronization signal block (SSB): means a resource block consisting of the specific number of consecutive symbols and resource blocks on time/frequency side consisting of a primary synchronization signal (PSS), a secondary SS, and PBCH (+PBCH DMRS) (the same beam is applied to signals within one SSB)

In addition, uplink (UL) physical layer signals of the 3GPP NR system are as follows. In the same manner, more detailed description refers to 3GPP TS 38.211 and TS 38.214.
  SRS: signal for UL channel state information (CSI) acquisition, UL beam measurement, and antenna port selection
  UL DMRS: RS for PUSCH demodulation
  UL phase-tracking RS (PT-RS): RS transmitting for phase noise compensation of the base station PRACH Design and RA Procedure in NR The following description relates to briefly summarized contents for the PRACH design of a random access procedure and a 3GPP NR system, and may be different from an accurate design of NR and a simultaneous design.

An accurate design may be slightly different for each release and for each version, and is described in 3GPP TS 38.211, TS 38.212, tS 38.213, TS 38.214, tS 38.321, TS 38.331.

Physical Random Access Channel (PRACH) Design

First, the principle of a PRACH design is described.
Support beam-based PRACH preamble transmission and reception
Support both FDD and TDD frame structures
Provide a dynamic cell range (a maximum 100 km)
Support a high-speed vehicle (e.g., a maximum 500 km/h)
Support a wide frequency range (e.g., a maximum 100 GHz)
Next, a sequence for a PRACH preamble is described.
ZC sequence
Provide an excellent cross-correlation characteristic and a low PAPR/CM
Sequence having two lengths for a PRACH preamble in NR
a long preamble sequence (L=839)
(Use Case) used for only LTE coverage, a high-speed case/FR1
a short preamble sequence (L=139)
A multi-beam scenario is supported, and a TDD frame structure/preamble is arranged with an OFDM symbol boundary/used for both FR1 and FR2
In the case of FR1, support subcarrier spacing of 15 kHz and 30 khz
In the case of FR2, support subcarrier spacing of 60 kHz and 120 kHz.

Table 6 below illustrates an example of a long sequence-based PRACH preamble, and relates to long preamble formats (LRA=839, subcarrier spacing={1.25, 5}kHz).

TABLE 6

| Format | SCS | TCP (Ts) | TSEQ (Ts) | TGP (Ts) | Use Case |
|---|---|---|---|---|---|
| 0 | 1.25 kHz | 3168k | 24576k | 2976k | LTE coverage |
| 1 | 1.25 kHz | 21024k | 2 · 24576k | 21984k | Large cell, Up to 100 km |
| 2 | 1.25 kHz | 4688k | 4 · 24576k | 19888k | Related |
| 3 | 5 kHz | 3168k | 4 · 6144k | 2976k | High speed |

Table 7 below illustrates an example of a short sequence-based PRACH preamble, and relates to short preamble formats (LRA=139, subcarrier spacing={15, 30, 60, 120}kHz).

TABLE 7

| Format | # of Sequence | TCP | TSEQ | TGP | Path profile (Ts) | Path profile (us) | Maximum Cell radius (meter) |
|---|---|---|---|---|---|---|---|
| A 1 | 2 | $288 k \cdot 2^{-u}$ | $2 \cdot 2048 k \cdot 2^{-u}$ | $0 k \cdot 2^{-u}$ | 96 | 3.13 | 938 |
| 2 | 4 | $576 k \cdot 2^{-u}$ | $4 \cdot 2048 k \cdot 2^{-u}$ | $0 k \cdot 2^{-u}$ | 144 | 4.69 | 2,109 |
| 3 | 6 | $864 k \cdot 2^{-u}$ | $6 \cdot 2048 k \cdot 2^{-u}$ | $0 k \cdot 2^{-u}$ | 144 | 4.69 | 3,516 |

TABLE 7-continued

| Format | | # of Sequence | TCP | TSEQ | TGP | Path profile (Ts) | Path profile (us) | Maximum Cell radius (meter) |
|---|---|---|---|---|---|---|---|---|
| B | 1 | 2 | $216 k \cdot 2^{-u}$ | $2 \cdot 2048 k \cdot 2^{-u}$ | $72 k \cdot 2^{-u}$ | 72 | 3.13 | 469 |
| | 2 | 4 | $360 k \cdot 2^{-u}$ | $4 \cdot 2048 k \cdot 2^{-u}$ | $216 k \cdot 2^{-u}$ | 144 | 4.69 | 1,055 |
| | 3 | 6 | $504 k \cdot 2^{-u}$ | $6 \cdot 2048 k \cdot 2^{-u}$ | $360 k \cdot 2^{-u}$ | 144 | 4.69 | 1,758 |
| | 4 | 12 | $936 k \cdot 2^{-u}$ | $12 \cdot 2048 k \cdot 2^{-u}$ | $792 k \cdot 2^{-u}$ | 144 | 4.69 | 3,867 |
| C | 0 | 1 | $1240 k \cdot 2^{-u}$ | $2048 k \cdot 2^{-u}$ | $1096 k \cdot 2^{-u}$ | 144 | 4.69 | 5300 |
| | 2 | 4 | $2048 k \cdot 2^{-u}$ | $4 \cdot 2048 k \cdot 2^{-u}$ | $2912 k \cdot 2^{-u}$ | 144 | 4.69 | 9200 |

An RACH slot is described below.

An RACH slot includes one or multiple RACH Occasion(s).

Slot duration is 1 ms for {1.25 kHz, 5 kHz} subcarrier spacing, and has scalable duration (i.e., 1 ms, 0.5 ms, 0.25 ms, 0.125 ms) for {15 kHz, 30 kHz, 60 kHz, 120 kHz} subcarrier spacing.

A start OFDM symbol index in an RACH slot has {0,2,x} values for short preamble formats.

FIG. 12 illustrates an example of start OFDM symbols. Specifically, FIG. 12a illustrates a case where the start OFDM symbol is '0', and FIG. 12b illustrates a case where the start OFDM symbol is '2.'

An RACH configuration table is described below.

Multiple tables may be defined based on a frequency range and a duplex scheme.

FDD and FR1 (for both long preamble and short preamble formats)

TDD and FR1 (for both long preamble format and short preamble format)

TDD and FR2 (for only a short preamble format)

FIG. 13 illustrates an example of an RACH configuration table.

The association of an SSB and an RACH occasion is described.

A time interval from SSB to RO association

The smallest value of a set determined by an RACH configuration

All of actually transmitted SSBs may be mapped to ROs within a time interval at least once.

Table 8 below is a table illustrating an example of RACH configuration intervals and mapping interval sets, and FIG. 14 is a diagram illustrating an example of RACH configuration intervals and mapping interval sets.

TABLE 8

| RACH configuration period (ms) | Mapping Period set (# of RACH configuration period) |
|---|---|
| 10 | {1, 2, 4, 8, 16} |
| 20 | {1, 2, 4, 8} |
| 40 | {1, 2, 4} |
| 80 | {1, 2} |
| 160 | {1} |

Random Access (RA) Procedure

RA may be triggered by several events.
Initial access in RRC IDLE
RRC connection re-establishment procedure
Handover
If an UL synchronization state is 'asynchronization', DL or UL data arrival during RRC_CONNECTED
Transition in RRC_INACTIVE
Another system information (SI) request
Beam failure recovery Two types of RACH procedures in NR are described with reference to FIG. 15.

FIG. 15a is a contention-based RACH procedure, and FIG. 15b is a contention-free RACH procedure.

FIG. 16 illustrates an example of an overall RACH procedure.

First, MSG1 transmission is described.

Subcarrier spacing for MSG1 is configured in an RACH configuration, and is provided in a handover command with respect to a contention-free RA procedure for handover.

Preamble indices for contention-based random access (CBRA) and contention-free random access (CFRA) are consecutively mapped to one SSB in one RACH transmission occasion.

CBRA
Association between an SS block (SSB) within an SS burst set and a subset of RACH resources and/or preamble indices is configured by a parameter set in an RMSI.

CFRA
A UE may be configured transmit multi-MSG1s through a dedicated multi-RACH transmission occasion in the time domain before the end of a monitored RAR window.

Furthermore, association between a CFRA preamble and an SSB is reconfigured through UE-specific RRC.

Next, a random access response (MSG2) configuration is described.

Subcarrier spacing (SCS) for MSG2 is the same as the SCS of remaining minimum SI (RMSI).

Furthermore, the SCS is provided in a handover command with respect to a contention-free RA procedure for handover.

Furthermore, MSG2 is transmitted within a UE minimum DL BW.

The size of a RAR window is the same for all RACH opportunities, and is configured in the RMSI.
A maximum window size: depends on the worst gNB latency after Msg1 reception including processing delay, scheduling delay, etc.
A minimum window size: depends on duration of Msg2 or CORESET and scheduling latency Next, a timing advance (TA) command in MSG2 is described.

This is used to control uplink signal transmission timing.
First, in the case of LTE,
TA resolution is 16 Ts (Ts=1/(2048×15000)).
A TA range uses 1282×TA step size ~667.66.→100.16

In an RAR, a timing advance (TA) has values from 0 to 1,282, and set to 11 bits.

In the case of NR,

In TR38.913, this is used in a very long coverage (150 Km~300 Km).

A TA increase in 2,564 or 3,846 TA_step (12 its)

FIG. 17 is a diagram illustrating an example of TA.

RA-RNTI

RA_RNTI is determined by a UE by transmitting timing of a PRACH Preamble.

That is, RA_RNTI may be determined by Equation 4 below.

$$RA\_RNTI=1+s\_id+14*t\_id+14*X*f\_id+14*X*Y*ul\_carrier\_id \quad [\text{Equation 4}]$$

In Equation 4, s_id indicates the first OFDM symbol index (0≤s_id<14), t_id indicates the first slot index in a system frame (0≤t_id<X), X is fixed 80 for 120 kHz SCS, f_id indicates a frequency domain index (0≤f_id<Y), Y is fixed 8 for a maximum #n of FDMed ROs, and ul_carrier_id indicates an indication of an UL carrier (0:normal, 1:SUL).

A minimum gap between MSG2 and MSG3 is duration of N1+duration of N2+L2+TA.

In this case, N1, N2 are front loaded+additional DMRS and a UE capability, L2 is a MAC process latency (500 us), and TA is the same as a maximum timing advance value.

If MSG2 does not include a response to a transmitted preamble sequence,

A new preamble sequence is transmitted after duration of N1+Δnew+L2.

Table 9 illustrates an example of a DCI format 1-0 having an RA-RNTI.

TABLE 9

| Field | Bits | Comment |
|---|---|---|
| Identifier for DCI formats | 1 | Reserved |
| Frequency domain resource assignment | | |
| Time domain resource assignment | X | Defined in Subclause 5.1.2.1 of TS 38.214 |
| VRB-to-PRB mapping | 1 | |
| Modulation and coding scheme | 5 | Use MCS table without 256QAM (UE capabilities not yet known) |
| New data indicator | 1 | Reserved |
| Redundancy version | 2 | Reserved |
| HARQ process number | 4 | Reserved |
| Downlink assignment index | 2 | Reserved |
| TPC command for scheduled PUCCH | 2 | Reserved |
| PUCCH resource indicator | 3 | Reserved |
| PDSCH-to-HARQ feedback timing indicator | 3 | Reserved |

Next, Message3 is described.

MSG3 is scheduled by an uplink grant in the RAR.

The MSG3 is transmitted after a minimum time interval from the end of MSG2.

Transmission power of MSG3 is configured in MSG2.

An SCS for MSG3 is configured in an RMSI including 1 bit (independently of an SCS for MSG1).

MSG3 includes a UE-Identity and an establishment cause.

First, with respect to the UE-Identity, an IMSI is transmitted in a message when it is first attached to a network.

If a UE is previously attached, an S-TMSI is included in the message.

Furthermore, the establishment cause may include emergency, MO-signaling, MO-data, MT-access, high-priority access, etc.

Table 10 below illustrates an example of a DCI format 0-0 having a TC-RNTI for MSG3 retransmission.

TABLE 10

| Field | Bits | Comment |
|---|---|---|
| Identifier for DCI formats | 1 | Indicate UL |
| Frequency domain resource assignment | | |
| Time domain resource assignment | X | Defined in Subclause 5.1.2.1 of TS 38.214 |
| VRB-to-PRB mapping | 1 | |
| Modulation and coding scheme | 5 | Use MCS table without 256QAM (UE capabilities not yet known) |
| New data indicator | 1 | Reserved |
| Redundancy version | 2 | Defined in Table 7.3.1.1.1-2 |
| HARQ process number | 4 | Reserved HARQ process 0 is always used |
| TPC command for scheduled PUCCH | [2] | Defined in Subclause 7.2.1 of TS 38.213 |
| UL/SUL indicator | 1 | |

An MSG4 configuration is described.

An MSG4 configuration is limited within a UE minimum DL BW.

An SCS for MSG4 is the same as a numerology for an RMSI and MSG2.

A minimum gap between the starts of MSG4 and HARQ-ACK is N1+L2.

In this case, N1 indicates a UE processing time, and L2 indicates a MAC layer processing time.

Retransmission order of MSG 3 and a distinction between MSG4s are described.

MSG3 retransmission: DCI format 0-0 having a TC-RNTI

MSG4: DCI format 1-0 having a TC-RNTI

FIG. 18 illustrates an example of the retransmission of MSG3 and MSG4 transmission.

Table 11 below is a table illustrating an example of DCI format 1-0 having a TC-RNTI for MSG4.

TABLE 11

| Field | Bits | Comment |
|---|---|---|
| Identifier for DCI formats | 1 | Indicate UL |
| Frequency domain resource assignment | | |
| Time domain resource assignment | X | Defined in Subclause 5.1.2.1 of TS 38.214 |
| VRB-to-PRB mapping | 1 | |
| Modulation and coding scheme | 5 | Use UE-capability-independent MCS table |
| New data indicator | 1 | Reserved |
| Redundancy version | 2 | Defined in Table 7.3.1.1.1-2 |
| HARQ process number | 4 | Reserved HARQ process 0 is always used |
| TPC command for scheduled PUCCH | [2] | Defined in Subclause 7.2.1 of TS 38.213 |
| UL/SUL indicator | 1 | |

Hereinafter, a random access procedure of an NR system is more specifically described.

A UE may transmit a PRACH preamble in UL as Msg1 of a random access procedure.

Random access preamble sequences having two different lengths are supported. A long sequence length 839 is applied as subcarrier spacing of 1.25 and 5 kHz, and a short sequence length 139 is applied as subcarrier spacing of 15, 30, 60 and 120 kHz. The long sequence supports a not-limited types set and limited types of sets A and B, but the short sequence supports only a not-limited type set.

Multiple RACH preamble formats are defined as one or more RACH OFDM symbols and different cyclic prefixes and a guard time. A PRACH preamble configuration is provided to a UE within system information.

If a response to Msg1 is not present, a UE may retransmit a PRACH preamble with power ramping within a given number. The UE calculates PRACH transmission power for the retransmission of a preamble based on the most recent estimation path loss and a power ramping counter. If the UE performs beam switching, the power ramping counter is not changed.

System information notifies the UE of association between SS blocks and RACH resources.

FIG. 19 illustrates a threshold concept of an SS block for RACH resource association.

Referring to FIG. 19, a threshold of an SS block for RACH resource association is based on RSRP and a network configuration. The transmission or retransmission of an RACH preamble is based on an SS block that satisfies a threshold.

When a UE receives a random access response through a DL-SCH, the DL-SCH may provide timing alignment information, an RA-preamble ID, initial UL approval and a temporary C-RNTI. Based on the information, the UE may perform UL transmission through an UL-SCH as Msg3 of a random access procedure. The Msg3 may include an RRC connection request and a UE identifier.

In response to the Msg3, a network may transmit Msg4. The Msg4 may be treated as a contention solution message for DL. The UE may enter an RRC connected state by receiving the Msg4.

A more detailed description for each step is as follows.

Before a physical random access procedure is started, Layer 1 needs to receive an SS/PBCH block index set from a higher layer and provide a corresponding RSRP measurement set to the higher layer.

Before the physical random access procedure is started, Layer 1 receives next information from the higher layer.

A configuration of a physical random access channel (PRACH) transmission parameter (PRACH preamble format, a time resource, and a frequency resource for PRACH transmission).

A PRACH preamble sequence set (a logical root sequence table and a cyclic shift), a root sequence for a set type (a not-limited type, a restriction set A or a restriction set B), and a parameter for determining a cyclic shift thereof).

From a viewpoint of the physical layer, an L1 random access procedure includes the transmission of a random access response (RAR) message having a random access preamble (Msg1) and a PDCCH/PDSCH (Msg2) within a PRACH, and may include the PUSCH transmission of Msg3, and a PDSCH for a contention solution.

If the random access procedure is initiated by a "PDCCH order" for a UE, the transmission of a random access preamble has the same subcarrier spacing as that of the transmission of a random access preamble initiated by a higher layer.

If the UE is configured with uplink carriers for a serving cell and detects a "PDCCH order", the UE uses an UL/SUL indicator field value from the detected "PDCCH order" in order to determine an uplink carrier for corresponding random access.

In relation to the random access preamble transmission step, the physical random access procedure is triggered in response to a request for PRACH transmission by higher layers or a PDCCH command. A configuration for the PRACH transmission by a higher layer includes the followings:

A configuration for PRACH transmission.

A preamble index, preamble subcarrier spacing, $P_{PRACH,target}$, a corresponding RA-RNTI, and a PRACH resource.

A preamble is transmitted using a PRACH format selected with transmission power $P_{PRACH,b,f,c}(i)$ on the indicated PRACH resource.

The UE is provided with multiple SS/PBCH blocks associated with one PRACH case based on a value of a higher layer parameter SSB-perRACH-Occasion. When the SSB-perRACH-Occasion value is smaller than 1, one SS/PBCH block is mapped to a 1/SSB-rach-occasion consecutive PRACH case.

The UE is provided with multiple preambles per SS/PBCH block based on the value of a higher layer parameter cb-preamblePerSSB, and determines a total number of preambles per SSB according to the PRACH occasion as a multiple of an SSB-perRACH-Occasion value and a value of cb-preamblePerSSB.

An SS/PBCH block index is mapped the PRACH case in a next order.

First, the order of a preamble index is increased within a single PRACH event.

Second, the order of a frequency resource index for a frequency-multiplexed PRACH case is increased.

Third, an increase order of a time resource index for a time-multiplexed PRACH case within a PRACH slot.

Fourth, an increase order of an index for a PRACH slot.

A period starting from a frame 0, for mapping an SS/PBCH block to a PRACH case is the smallest period among {1, 2, 4} PRACH configuration periods greater than or equal to $\lceil N_{Tx}^{SSB}/N_{PRACH\ period}^{SSB} \rceil$. In this case, a UE obtains $N_{Tx}^{SSB}$ from a higher layer parameter SSB-transmitted-SIB1. $N_{Tx}^{SSB}$ is the number of SS/PBCH block which may be mapped to one PRACH configuration cycle.

When a random access procedure is initiated by a PDCCH command, (if requested by a higher layer) the UE has to transmit a PRACH in the first possible PRACH occasion. The first possible PRACH occasion is a case where time between the last symbol of PDCCH order reception and the first symbol of a PRACH for transmission is greater than or equal to $N_{T,2}+\Delta_{BWPSwitching}+\Delta_{Delay}$ msec. $N_{T,2}$ is a time length of $N_2$ symbol, $\Delta_{BWPSwitching}$ is previously configured in a PUSCH processing capability 1, and a PUSCH preparation time corresponds to $\Delta_{Delay}>0$.

In response to the PRACH transmission, the UE attempts to detect a PDCCH having a corresponding RA-RNTI during a window controlled by a higher layer. The window starts in a first symbol of the fastest control resource set configured with respect to a Type1-PDCCH common search space, that is, a $\lceil (\Delta \cdot N_{slot}^{subframe,\mu} \cdot N_{symb}^{slot})/T_{sf} \rceil$ symbol at least after the last symbol of a preamble sequence transmitted by the UE. The length of the window is provided by a higher layer parameter rar-WindowLength based on the number of slots based on a subcarrier space for the Type0-PDCCH common search space.

When the UE detects the PDCCH having the corresponding RA-RNTI and a corresponding PDSCH including a DL-SCH transmission block within the corresponding window, the UE transmits a transport block to a higher layer.

The higher layer parses the transport block with respect to a random access preamble identifier (RAPID) related to the PRACH transmission. When the higher layer identifies the RAPID in the RAR message(s) of the DL-SCH transmission block, the higher layer indicates an uplink permission for the physical layer. Such indication is denoted as a random access response (RAR) UL grant in the physical layer. If the higher layer does not identify an RAPID related to the PRACH transmission, the higher layer may instruct a physical layer in order to transmit the PRACH.

A minimum time between the last symbol of a PDSCH for reception and the first symbol of the PRACH transmission is the same as $N_{T,1}+\Delta_{new}+0.5$ msec. In this case, $N_{T,1}$ msec is duration of an $N_1$ symbol corresponding to a PDSCH reception time for the PDSCH capability 1 when $\Delta_{new} \geq 0$ if an additional PDSCH DM-RS is configured.

The UE needs to receive a PDCCH having an RA-RNTI corresponding to the PDSC, including a DL-SCH transmission block having the same DM-RS antenna port quasi co-location attributes for the detected SS/PBCH block or the received CSI-RS. When the UE attempts to the PDCCH having a corresponding RA-RNTI in response to the PRACH transmission initiated by a PDCCH command, the UE assumes that the PDCCH and a PDCCH order have the same DM-RS antenna port quasi co-location attributes.

An RAR UL grant from the UE (Msg3 PUSCH) schedules PUSCH transmission. The contents of the RAR UL grant that starts from the MSB and ends at the LSB are illustrated in Table 12 below. Table 12 below lists field sizes of random access response grant contents.

TABLE 12

| RAR grant field | Number of bits |
| --- | --- |
| Frequency hopping flag | 1 |
| Msg3 PUSCH frequency resource allocation | 12 |
| Msg3 PUSCH time resource allocation | 4 |
| MCS | 4 |
| TPC command for Msg3 PUSCH | 3 |
| CSI request | 1 |
| Reserved bits | 3 |

Msg3 PUSCH frequency resource allocation is for an uplink resource allocation type 1. In the case of frequency hopping, a 1- or 2-bits $N_{UL,hop}$ bit field of Msg3 PUSCH frequency resource allocation is used as a hopping information bit as described with reference to Table 10 based on the indication of a frequency hopping flag field.

An MCS is determined from the first 16 indices of a corresponding MCS index table for a PUSCH. A TPC command $\delta_{msg2,b,f,c}$ is used to configure power of an Msg3 PUSCH, and is interpreted based on Table 13 below illustrating TPC commands $\delta_{msg2,b,f,c}$ for the Msg3 PUSCH.

TABLE 13

| TPC Command | Value (in dB) |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

In a non-contention-based random access procedure, a CSI request field is interpreted to determine whether an aperiodic CSI report is included in corresponding PUSCH transmission. In a contention-based random access procedure, a CSI request field is reserved.

The UE receives a subsequent PDSCH using the same subcarrier spacing as that of the reception of a PDSCH that provides an RAR message unless subcarrier spacing is configured.

If the UE does not detect a PDCCH having a corresponding RA-RNTI and a corresponding DL-SCH transmission block within the window, the UE performs a random access response reception failure procedure.

For example, the UE may perform power ramping for the retransmission of a random access preamble based on a power ramping counter. However, as illustrated in FIG. 20, if the UE performs beam switching in PRACH retransmission, the power ramping counter is not changed.

Referring to FIG. 20, when retransmitting the random access preamble for the same beam, the UE may increase the power ramping counter by 1. However, when the beam is changed, the power ramping counter is not changed.

In relation to the transmission of the Msg3 PUSCH, the higher layer parameter msg3-tp indicates whether to apply transform pre-coding for the transmission of the Msg3 PUSCH with respect to the UE. If the UE applies transform pre-coding to the transmission of the Msg3 PUSCH having frequency hopping, a frequency offset for a second hop is provided in Table 14 below. Table 14 illustrates frequency offsets for the second hop with respect to the transmission of the Msg3 PUSCH having frequency hopping.

TABLE 14

| Number of PRBs in initial active UL BWP | Value of $N_{UL,hop}$ Hopping Bits | Frequency offset for 2nd hop |
| --- | --- | --- |
| $N_{BWP}^{size} < 50$ | 0 | $N_{BWP}^{size}/2$ |
|  | 1 | $N_{BWP}^{size}/4$ |
| $N_{BWP}^{size} \geq 50$ | 00 | $N_{BWP}^{size}/2$ |
|  | 01 | $N_{BWP}^{size}/4$ |
|  | 10 | $-N_{BWP}^{size}/4$ |
|  | 11 | Reserved |

Subcarrier spacing for the transmission of the Msg3 PUSCH is provided by a higher layer parameter msg3-scs. The UE needs to transmit a PRACH and an Msg3 PUSCH in the same uplink carrier of the same serving cell. An UL BWP for the transmission of the Msg3 PUSCH is indicated by SystemInformationBlockType1.

When a PDSCH and a PUSCH have the same subcarrier spacing, a minimum time between the last symbol of PDSCH for reception that carries an RAR and a first symbol of the corresponding Msg3 PUSCH scheduled by the RAR in the PDSCH for the transmission to the UE is identical with $N_{T,1}+N_{T,2}+N_{TA,max}+0.5$ msec. $N_{T,1}$ is duration of an $N_1$ symbol corresponding to a PDSCH reception time for the PDSCH processing capability 1 when an additional PDSCH DM-RS is configured. $N_{T,2}$ is duration of an $N_2$ symbol corresponding to a PUSCH preparation time with respect to the PUSCH processing capability 1. Furthermore, $N_{TA,max}$ is a maximum timing adjustment value which may be provided by a TA command field within the RAR.

In response to the transmission of the Msg3 PUSCH indicating that a C-RNTI has not been provided, the UE attempts to detect a PDCCH along with a TC-RNTI corresponding to the scheduling of a PDSCH including a UE contention resolution identity. In response to the reception of the PDSCH having the UE contention resolution identity, the UE transmits HARQ-ACK information in a PUCCH. A minimum time between the last symbol of the PDSCH for reception and a first symbol of corresponding HARQ-ACK for transmission is the same as $N_{T,1}+0.5$ msec. $N_{T,1}$ is duration of the $N_1$ symbol corresponding to the PDSCH reception time for the PDSCH processing capability 1 when an additional PDSCH DM-RS is configured.

PUSCH Transmission Related Procedure

If a UE is configured by a higher layer to decode a PDCCH CRC-scrambled by a C-RNTI, the UE needs to decode the PDCCH and transmit a corresponding PUSCH.

The transmission of the PUSCH may be dynamically scheduled in DCI by an UL grant or may be semi-statically configured as soon as when a higher layer parameter of configuredGrantConfig including rrc-ConfiguredUplinkGrnat is received without detecting an UL grant or may be may be semi-statically configured based on configuredGrantConfig not including rrc-ConfiguredUplinkGrant semi-statically scheduled by an UL grant after a higher layer parameter configuredGrantConfig not including rrc-ConfiguredUplinkGrant is received.

In the case of a PUSCH scheduled by a DCI format 0_0 in a cell, a UE may transmit the PUSCH based on a spatial relation corresponding to a PUSCH resource.

In relation to a PUSCH transmission scheme, codebook-based transmission (CB transmission) and non-codebook-based transmission (NCB transmission) may be supported. A UE may perform CB transmission when a higher layer parameter txConfig in PUSCH-Config is configured as a 'codebook', and may perform NCB transmission when the txConfig is configured as 'nonCodebook.' If the txConfig is not configured, PUSCH transmission may be based on one PUSCH antenna port, which may be triggered by the DCI format 0_0.

First, codebook-based uplink transmission is specifically described.

In the case of CB transmission, a UE may determine a PUSCH transmission precoder based on an SRS resource indicator (SRI), a transmit precoding matrix indicator (TPMI), and a transmit rank indicator (TRI). In this case, the SRI, the TPMI, and the TRI may be given by SRS resource indicator field information, precoding information and the number of layers information included in a DCI field. The TPMI may be used to indicate a precoder to be applied through antenna ports $\{0 \ldots v-1\}$ corresponding to an SRS resource selected by an SRI, when multiple SRS resources are configured or one SRS resource is configured, or the TPMI may be used to indicate a precoder to be applied through antenna ports $\{0 \ldots v-1\}$ corresponding to an SRS resource.

The transmission precoder may be selected in an uplink codebook including the same multiple antenna ports as a higher layer parameter nrofSRS-Ports of SRS-Config. When the UE is configured to have a higher layer parameter txConfig configured as a 'codebook', the UE may be configured with at least one SRS resource. An SRI indicated in a slot n may be related to the most recent transmission of an SRS resource prior to a PDCCH that carries an SRI prior to the slot n, that is, an SRS resource identified by the SRI.

Furthermore, in the case of CB transmission, a UE may be configured with a single SRS resource set. Only one SRS resource may be indicated in an SRI within the SRS resource set. A maximum number of SRS resources configured for the CB transmission may be 2. When an aperiodic (AP)-SRS is configured for the UE, an SRS request field of DCI may trigger the transmission of an AP-SRS resource. Furthermore, when multiple SRS resources are configured, the UE may expect that the higher layer parameter nrofSRS-Ports of SRS-Config is set as the same value in all SRS resources and a higher layer parameter resourceType of SRS-ResourceSet is set as the same value for all the SRS resources.

Next, non-codebook-based uplink transmission is specifically described.

In the case of NCB transmission, a UE may determine its own PUSCH precoder and transmission rank based on a wideband SRI given by an SRI field from DCI. The UE may use one or multiple SRS resources for SRS transmission. The number of SRS resources which may be configured for the UE for simultaneous transmission in the same RB may be a UE capability. Furthermore, only one SRS port may be configured for each SRS resource. Furthermore, if a higher layer parameter usage of SRS-Config is configured as 'non-Codebook', only one SRS resource set may be configured. A maximum number of SRS resources which may be configured for non-codebook-based uplink transmission is 4. Furthermore, an SRI indicated in a slot n may be related to the most recent transmission of an SRS resource prior to a PDCCH that carries an SRI prior to the slot n, that is, an SRS resource identified by the SRI.

In the case of NCB transmission, a UE may calculate a precoder to be used for precoding or the transmission of an SRS based on the measurement of an associated NZP CSI-RS resource. The UE may be configured with only one NZP CSI-RS resource for an SRS resource set. Furthermore, in the case of NCB transmission, the UE does not expect that both associatedCSI-RS in SRS-Config for an SRS resource set and spatialRelationInfo for an SRS resource may be configured. Furthermore, in the case of NCB transmission, when at least one SRS resource is configured, the UE may be scheduled by the DCI format 0_1.

Transmission Unit/Reception Unit (e.g., a Panel)-Related General

In current/future wireless communication systems, various UE types need to be considered and supported.

A current LTE system has been optimized for a single panel UE.

A multi-panel UE is supported in a Rel-15 NR system having a very restricted range.

In Rel-15 NR, multiple SRS resources may be configured for a UE. If multiple SRS resources are configured, the UE may transmit a set of SRS antenna resources configured in an SRS resource from one panel, a set of other SRS resources configured in another SRS resource from another panel, etc.

With respect to non-codebook-based uplink transmission, a set of SRS resources may be transmitted by the same panel by applying different beams. Another set of SRS resources may be transmitted by another panel by applying different beams. In this case, only one port (i.e., port-wise) SRS beamforming is applied to each SRS resource. That is, each SRS resource/port corresponds to a layer candidate to be applied to future PUSCH transmission.

In summary, a UE may use a different transmission panel for the transmission of different (a set of) SRS resources.

A gNB receives and compares SRS resources. Thereafter, the gNB selects one of configured SRS resources and transmits an SRS resource indicator (SRI) along with a transmit precoding matrix indicator (TPMI) and a transmit rank indicator (TRI) with respect to codebook-based PUSCH transmission.

When the UE accurately receives a command, the UE needs to use a panel indicated through the SRI for PUSCH transmission. With respect to non-codebook-based UL transmission, the gNB needs to merely transmit only an SRI(s), and the UE needs to apply a layer selected from a panel.

If Rel-15 codebook (CB)-based UL transmission is applied to multi-panel UEs, the following restriction contents are applied.

A different number of transmission antenna ports per panel are not supported.

The simultaneous use of multiple panels for PUSCH transmission is disabled or limitedly supported.

The following restriction contents are present with respect to non-codebook-based UL transmission.

Ambiguity related to a method of mapping each SRS resource to each panel

The simultaneous use of multiple panels for PUSCH transmission is disabled or limitedly supported Another important thing of multi-panel UEs is the distance between panels.

With respect to a handheld device, the distance between panels is not distant, but the distance between panels may be distant in the case of a large-sized device, such as a vehicle.

With respect to a vehicle UE, a vehicle (e.g., a car) may be a device which receives a signal for downlink (DL) and transmits a signal for uplink (UL).

With respect to a sidelink, a vehicle may be a transmitter and/or a receiver. Most of current vehicles have antennas (e.g., a single panel) geographically deployed at the same location. In order to obtain more gains from multiple antennas (e.g., beamforming or spatial diversity), geographically distributed antennas (e.g., multi-panels) are considered to satisfy NR requirement contents (some NR bands need to use four or more Rx antennas).

With respect to geographically distributed antennas, the distance between panels may be several meters or more on the vehicle UE side (e.g., one panel in a front bumper and the other panel in a rear bumper).

Additionally, the orientation/boresight/direction of each panel may be different. Accordingly, fading characteristics of panels may be quite different.

Furthermore, each panel may have a different hardware characteristic. If geographically distributed antennas share a common baseband processor (modem), the distance from each panel to the baseband processor may be different.

Accordingly, a gain imbalance between different panels may occur in both transmission and reception. Furthermore, a difference between cable lengths may cause different latency (i.e., timing synchronization) in different panels. Since the addition of a timing adjustment processor/circuit may increase a UE implementation cost, a timing difference between different panels may be internally adjusted depending on a UE implementation or may not be adjusted.

In addition to cabling, if a different hardware configuration element (e.g., an oscillator, a different RF/circuit structure, an amplifier, or a phase shifter) per panel is used, there may occur a difference between channel characteristics experienced in different panels, such as phase noise, a frequency offset, or a timing offset.

In the present disclosure, a 'panel' may mean a physical transmission/reception antenna group closely located in relation to a hardware implementation.

In general, an (UL) panel, an uplink synchronization unit (USU), an uplink transmission unit (UTU), etc. which are used in the present disclosure may be represented as a transmission unit, and may be used as various expressions within a range in which meanings thereof are not different. Furthermore, in general, a (DL) panel, a downlink synchronization unit (DSU), a downlink transmission unit (DTU), etc. which are used in the present disclosure may be represented as a reception unit, and may be used as various expressions within a range in which meanings thereof are not different.

However, from a viewpoint of a standard document, a 'panel' may indicate a group of antenna ports (i.e., logical antennas) having a common feature from a viewpoint of a valid channel due to shared hardware components (e.g., an amplifier and a hardware board) in addition to not-far geographical locations.

More specifically, long-term channel characteristics of antenna ports transmitted by the same panel, such as an average path-loss, an average Doppler shift, or average delay, may be monitored by a receiver similarly or identically.

With respect to a reception viewpoint, a signal monitored by different logical antennas within the same panel with respect to a transmitted antenna port may be assumed to have a common feature from a viewpoint of a long-term channel characteristic.

In addition to the aforementioned long-term channel characteristics, a panel may share the same Tx/Rx (analog) beam or beam set, but other panels may use different (analog) beams or beam sets. That is, there is a good possibility that each panel may individually control a beam due to a geographical difference.

In the present disclosure, '/' may mean 'or' or 'and/or' depending on context.

the present disclosure focuses on an UL synchronization problem related to multi-panel UEs, in particular, among the aforementioned problems. The best timing advance (TA) value for multi-panel UEs may be different for each panel depending on the aforementioned UE implementation (e.g., a distributed antenna in a UE). In previous systems, since it is assumed that a geographical location between a UE and multiple antennas is sufficiently close, one TA value is provided by a gNB with respect to one component carrier (CC) of the same device.

Furthermore, UL Tx timing through different transmission antennas is assumed to be well-calibrated within a UE as a UE implementation.

As described above, the two existing assumptions (geographical location and internal calibration) may be no longer maintained with respect to a new device type (e.g., vehicle UE).

Accordingly, it is necessary to introduce a new signaling method of allowing a different TA value for a different panel.

A unit in which a common TA value is shared/not shared may not be matched with a hardware implementation for an actual panel. For example, some panels may share the same TA value although they are plural panels if the panels have been well calibrated in a way to be internally and/or geographically close. As another example, each panel may generate a plurality of UL (analog) beams or may be configured with a plurality of UL antenna subsets. There is a possibility that panels may have very different channel characteristics for each different beam (set) or antenna subset although the panels belong to the same panel depending on a UE implementation method.

For example, if different beams are generated within a panel using different antenna sets and hardware characteristics of the antenna sets are significantly different, the assumption (i.e., one TA value per panel per CC) may be inaccurate. Accordingly, there is proposed to define a common term (i.e., UL synchronization unit (USU)) indicating a group of UL antenna ports and/or a group of physical UL channels that are synchronized (in relation to UL timing).

The USU may correspond to one or more UL panels, one or more UL beams, or a group of UL antennas within UL panels depending on different UE implementations.

Hereinafter, a method of setting a plurality of TA values (or TA offset values) upon multiple USUs-based uplink transmission (per CC or per BWP), which is proposed in the present disclosure, is specifically described through related drawings and proposals.

Hereinafter, USU definition and related contents are described.

A common term "UL synchronization unit (USU)" that associates/groups UL antenna ports (APs) and/or physical UL channels to which a common TA value is applied within a CC (or within a BWP) may be defined.

The USU may include UL antenna ports (APs) having different RS/channel types in addition to the same RS/channel type.

For example, the USU may include a set of SRS APs (or SRS resources), a set of PUCCH DMRS APs (or PUCCH resources), a set of PUSCH DMRS APs (or PUSCH resources) and/or a set of PRACH preamble/resources.

Grouped APs/channels may share a common TA value per CC/BWP, and not-grouped APs/channels may have different TA values per CC/BWP. That is, the USU may be a unit for APs/channels that share a common TA value.

The USU may mean one or multiple UL panels, one or multiple UL beams, or an UL antenna group within an UL panel.

Most of information on the aforementioned USU may be provided by RRC signaling so that it is not frequently changed.

However, a specific type of APs/channels associated with the USU may need to be more frequently changed compared to other methods depending on panel activation/deactivation, a wireless channel state, etc.

For example, association between the USUs of PUCCHs/PUSCHs (APs) needs to be more frequently changed than association between the USUs of SRSs/PRACHs.

Therefore, lower layer signaling (e.g., MAC CE and/or DCI) rather than the RRC layer may be used to change USU mapping for APs/channels more rapidly and frequently.

FIG. 21 is a diagram illustrating a concept of a USU proposed in the present disclosure.

The USU may be interpreted as the same meaning as a panel, but is more accurately a concept corresponding to multiple panels. In this case, as illustrated in FIG. 21, the USU may mean an antenna (port) group at a specific location.

In a vehicle (vehicle UE) of FIG. 21, four USUs 2101, 2102, 2103, and 2104 are illustrated. Each of the USUs may correspond to an antenna group including two antennas (or antenna ports).

Furthermore, the aforementioned contents are described based on a transmission unit (e.g., USU) related to the transmission and reception of uplink, but the corresponding contents may also be extended and applied to a reception unit (e.g., a downlink synchronization unit (DSU)) related to the transmission and reception of downlink.

Furthermore, in the present disclosure, the USU may indicate a group of UL antenna ports, a group of UL resources, a panel, etc. which has common properties (e.g., a common TA value and a common power control parameter). For example, the USU described with reference to the present disclosure may be denoted as and/or substituted with at least one uplink transmission entity (UTE), at least one UTE group, at least one panel, at least one panel group, at least one beam, at least one beam group, at least one antenna (or antenna port), at least one antenna group (or antenna port group), etc. Furthermore, in the present disclosure, an antenna or an antenna port may be a physical or logical antenna or antenna port.

As described above, the UL transmission scheme in the NR system may be divided into the codebook (CB)-based UL scheme and the non-codebook (NCB)-based UL scheme. In particular, the codebook-based UL scheme may be considered to be an operation based on a single-panel UL scheme because a single SRI is only permitted to be indicated upon UL scheduling. Furthermore, since the best SRI may be dynamically indicated in an UL grant, there may be an effect in that a corresponding single-panel can be instantaneously and dynamically selected.

In relation to UL beam management (UL BM) in the NR system, if the same transmission (Tx) beam is not configured to be applied to SRS resources within an SRS resource set, a UE may apply different transmission beams to different SRS resources. In this case, the beams may be determined either in a gNB-transparent way or in a gNB indication way.

In this case, the gNB-transparent way may correspond to a case where an SRS resource set for beam management (BM) is configured for all SRS resources within the corresponding set without spatialRelationInfo. The aforementioned method of applying, by a UE, different transmission beams to different SRS resources may be essential for the corresponding UE when a beam correspondence of the UE is not established (or maintained). Furthermore, although a UE satisfies the beam correspondence, there is an advantage in that DL resource overhead related to DL BM can be reduced because a DL gNB transmission beam determination can be provided through the SRS transmission beam sweeping of the UE. When such points are considered, an SRS transmission beam sweeping operation in a UE may need to be guaranteed.

Accordingly, hereinafter, the present disclosure proposes a method for guaranteeing an uplink beam sweeping operation (i.e., an SRS transmission beam sweeping operation) on the UE side.

First Embodiment

First, in this embodiment, a method of guaranteeing SRS transmission beam sweeping in relation to a sounding procedure of a UE is described.

For example, it is assumed that usage for an SRS resource set is configured as beam management through a higher layer parameter (e.g., an SRS-SetUse, usage) and spatial related information (e.g., a higher layer parameter SRS-SpatialRelationInfo) related to a beam and/or a panel is not configured in any SRS resource within the SRS resource set.

In this case, a UE may apply that a spatial domain transmission filter (e.g., a beam) for an (i+1)-th SRS resource is different from a spatial domain transmission filter for an (i)-th SRS resource. In this case, the (i+1)-th SRS resource and the (i)-th SRS resource are included in the same SRS resource set. That is, in this case, the UE may differently apply a beam for neighboring SRS resources (i.e., SRS resources having consecutive indices) with respect to SRS resources within an SRS resource set configured by a base station. Accordingly, the aforementioned UL beam sweeping procedure based on the SRS of a UE can be guaranteed.

In other words, when a base station configures and/or indicates (initial) UL beam sweeping for a UE with intent, the corresponding base station may not configure (all) "spatialRelationInfo" parameters for SRS resources configured within a specific SRS resource set (for UL BM) as described above. Accordingly, the corresponding UE may be configured to recognize this as an SRS transmission method of applying (initial) UL beam sweeping and to initiate SRS transmission to which corresponding beam sweeping is applied.

For example, it is assumed that four SRS resources are configured within a corresponding SRS resource set and the UE supports two UL beams to which sweeping will be applied. In this case, there may occur a case where beam sweeping transmission for applying a total of four different beams to the four SRS resources is performed. Accordingly, a method of defining, configuring and/or indicating a specific rule, such as that of the aforementioned method, may be necessary. There may be various modified proposals for a method of an operation description, expressions of a technology and/or a configuration method for the aforementioned method may be present, but similar modified proposals may be recognized as being included in the spirit of the present disclosure.

That is, in the aforementioned example, a UE may be configured to transmit an SRS in a direction in which a specific UL beam is applied in an (i=0)-th (i.e., the first) SRS resource (i.e., transmit a corresponding SRS resource), but to transmit an SRS using a beam applied in a direction different from that of the specific UL beam in a subsequently configured (i=1)-th SRS resource. In this case, the specific UL beam may be determined by the UE or may be configured and/or indicated by a base station. Furthermore, a beam to be applied to a (i=2)-th SRS resource has only to be different from the beam in the (i=1)-th SRS resource. Accordingly, the UE may use the beam to be applied in the (i=0)-th SRS resource as the beam to be applied in the (i=2)-th SRS resource without any change.

For example, a case where a UE applies two beams (beam A and beam B) to beam sweeping is assumed. In this case, the UE may transmit an SRS in the 0-th configured SRS resource (e.g., an SRS resource ID=11) by applying the beam A, may transmit an SRS in the first configured SRS resource (e.g., an SRS resource ID=17) by applying the beam B, may transmit an SRS in the second configured SRS resource (e.g., an SRS resource ID=31) by applying the beam A, and may transmit an SRS in the second configured SRS resource (e.g., an SRS resource ID=8) by applying the beam B.

For another example, a case where a UE applies three beams (beam A, beam B, and beam C) to beam sweeping is assumed. In this case, the UE may transmit an SRS in the 0-th configured SRS resource (e.g., an SRS resource ID=11) by applying the beam A, may transmit an SRS in the first configured SRS resource (e.g., an SRS resource ID=17) by applying the beam B, may transmit an SRS in the second configured SRS resource (e.g., an SRS resource ID=31) by applying the beam C, and may transmit an SRS in the third configured SRS resource (e.g., an SRS resource ID=8) by applying the beam A or the beam B.

For yet another example, a case where a UE applies three beams (beam A, beam B, and beam C) to beam sweeping is assumed. In this case, the UE may transmit an SRS in the 0-th configured SRS resource (e.g., an SRS resource ID=11) by applying the beam A, may transmit an SRS in the first configured SRS resource (e.g., an SRS resource ID=17) by applying the beam B, may transmit an SRS in the second configured SRS resource (e.g., an SRS resource ID=31) by applying the beam C, and may transmit an SRS in the third configured SRS resource (e.g., an SRS resource ID=8) by applying the beam A or the beam B.

Second Embodiment

Next, the present embodiment proposes methods for more effectively applying an UL BM process in applying the aforementioned first embodiment.

As described above, it is assumed that a UE described in the present embodiment may perform separate UL transmission for each transmission unit (e.g., a USU, an (UL) panel, or a (Tx) beam group), such as that described above. In this case, the identifier (e.g., a USU ID, a panel ID or a beam group ID) of the transmission unit may be used to configure and/or indicate the separate UL transmission. Likewise, an identifier may be separately defined or configured for a reception unit (e.g., a DSU, a (DL) panel or an (Rx) beam group). The reception unit may mean a specific synchronization unit or a panel, etc. of a corresponding UE for DL reception. Alternatively, if a specific USU and DSU operate in the same panel, they may be collectively named a sync-unit (SU).

Furthermore, in applying the aforementioned method, unlike in the existing "dual connectivity" concept, it may be presupposed that power sharing between transmission units (e.g., USUs or panels) within the same cell is impossible. Accordingly, upon specific power headroom report (PHR), an operation in which a UE transmits multiple PHR reports for each specific transmission unit (e.g., a USU or a panel) through specific signaling (e.g., RRC signaling, MAC signaling or DCI signaling) may be configured and/or indicated.

Furthermore, a specific timing advance (TA) command may be configured and/or indicated for each transmission unit (e.g., a USU or a panel) by a base station. In this case, if the TA exceeds a cyclic prefix (CP) range (or in a situation in which an error of a specific level or more occurs although the TA exceeds the CP range), when DL reception through a first SU (SU 1) (or a first DSU (associated with the first USU)) and UL transmission through a second USU (USU 2) simultaneously occur, a situation in which the DL reception and the UL transmission cross the boundary between their signals and overlap may occur. In this case, priority between the DL reception and the UL transmission may be defined, configured and/or indicated.

For example, if the DL reception is prioritized, the UL transmission may be dropped (or postponed). That is, the DL reception through the first DSU or the first SU may be given priority over the UL transmission through the second USU. On the contrary, if the UL transmission is prioritized, the DL reception may be dropped (or postponed). That is, the UL transmission through the second USU may be given priority over the DL reception through the first DSU or the first SU.

When the aforementioned priority related operation is performed, a method of dropping all dropped portions in a specific format unit, such as a slot or a subframe, may be applied. Alternatively, for an object for minimizing a dropped portion, an operation of partially removing a part of an overlapped CP portion may be defined, configured and/or indicated. For example, a drop, puncturing, or rate-matching may be applied to only an overlapped symbol(s). By performing an operation of removing only a part of a CP portion, there is an effect in that transmission and reception that minimize a loss of the original signal (or without a loss) can be performed instead of handling for a multi-path environment.

Third Embodiment

Furthermore, in the present embodiment, an UL beam sweeping method which may be considered in applying the first embodiment and/or the second embodiment is described.

For example, a base station may independently configure an SRS resource set for each transmission unit (e.g., a USU, a panel or a beam group) (of a UE). In this case, the SRS resource set may have been configured for UL BM usage (e.g., higher layer parameter usage-beam management). In this case, the base station may configure an independent DL reference signal (DL RS) for each SRS resource set, so the UE is configured to perform an UL beam sweeping operation for each transmission unit (e.g., a USU, a panel or a beam group). In this case, the DL RS may be for local UL beam sweeping. In this case, the UL beam sweeping operation may be local UL beam sweeping. Furthermore, the DL RS may be different from a specific SSB resource (e.g., an SSB resource index or an SSB #ID) obtained in an initial access process.

If a UE is forced to perform an (initial) UL beam sweeping operation, in the aforementioned method (e.g., the first embodiment), the UE generates a beam related coefficient (and/or a spatial domain filter coefficient) based on an implementation of the UE per se and performs beam sweeping by applying a beam direction that is different as much as possible based on the number of SRS resources configured by a base station. Additionally, in the case of a method proposed in the present embodiment, the base station also configures information on a beam direction itself to be applied by the corresponding UE in a specific level. Accordingly, there is an effect in that the base station can adjust a beam direction to be applied by the UE.

In relation to the application of the method proposed in the present embodiment, to configure and/or indicate the DL RS information may mean configuring and/or indicating to generate (or apply) a beam(s) that enables the UE to apply (local) UL beam sweeping based on a beam direction in which a corresponding DL RS is received. Furthermore, a configuration parameter (or configuration information), indicating to a certain degree of a beam width a beam(s) will be swept based on a corresponding DL RS, may be additionally configured and/or indicated. For example, a base station may additionally configure and/or indicate, for the UE, a specific angular domain related parameter that provides beam width information, such as "angular spread."

Furthermore, a method of configuring and/or indicating, by a base station, beam information (e.g., a beam index or a beam ID) corresponding to the start and end of a corresponding (local) UL beam sweeping region may be considered in order for the base station to control the UE so that a UE performs (local) UL beam sweeping only within a desired specific beam width.

For example, if a base station indicates a beam A and a beam D together for a UE, the UE may recognize that (local) UL beam sweeping has been configured from a beam A direction indicated at the first entry to a beam D direction indicated at the second entry. In this case, the corresponding UE may perform SRS transmission by considering a configured (local) UL beam sweeping region. If four SRS resources are configured for a UE, the corresponding UE may generate a beam(s) so that the aforementioned (local) UL beam sweeping region is applied to each SRS resource, and may transmit an SRS.

In this case, beams (e.g., the beam A and the beam D) for indicating the (local) UL beam sweeping region may be configured and/or indicated using a defined specific beam identifier (beam ID). Alternatively, beams (e.g., the beam A and the beam D) for indicating the (local) UL beam sweeping region may be configured and/or indicated using a specific RS identifier (e.g., an SRS resource ID, a CSI-RS resource ID or an SSB ID) corresponding to the beams.

Furthermore, the base station may also designate a reception unit (e.g., an SU or a DSU) to be used by the UE for reception in relation to the configuration of the transmission unit. For example, the base station may configure and/or indicate the identifier (SU ID) of an SU (or the identifier (DSU ID) of a DSU) to be used by the UE, along with the aforementioned USU configuration, for specific DL reception (may include the DL RS). That is, configuration information for a link between the USU and the DSU (or between the SUs) may be transmitted and received between the base station and the UE. In other words, the base station may transmit panel pair link configuration information to the UE in relation to UL and/or DL transmission and reception. The UE may also be configured with a panel, etc. to be used for DL reception in performing UL beam sweeping based on the configuration and/or indication of the base station using the panel pair link configuration information. That is, the corresponding method has an effect in that a base station can control the reception panel, etc. of a UE.

Furthermore, in relation to the aforementioned (local) UL beam sweeping, a base station configures and/or indicates a specific RS identifier (e.g., an SRI, a CRI or an SSB ID) for a UE in an implicit form, so the corresponding UE may be configured to perform UL beam sweeping around a beam corresponding to a configured and/or indicated resource (e.g., an SRS resource, a CSI-RS resource or an SSB resource). Alternatively, if the UE receives information on two RS identifiers from the base station in relation to the UL beam sweeping, the corresponding UE may be configured to perform an UL beam sweeping operation only within a range determined by the two RS identifiers.

Furthermore, an additional operation considering the state (or capability) of a UE in which a panel (i.e., UL dedicated panel) including only a transmission unit (e.g., USU) for UL usage or a panel (i.e., DL dedicated panel) including a reception unit (e.g., DSU) for DL usage may be implemented may be defined, configured and/or indicated. For example, a case where a specific USU #1 and a specific DSU #1 associated with the USU #1 are present is assumed. In this case, the USU #1 and the DSU #1 may be mounted on one device and operate as an SU #1. In this case, in the case of an environment in which a beam correspondence of the UE is established (to a specific level or more), there may be a correlation in the relation between the beams of a specific signal received by the UE through the DSU #1 and a signal to be transmitted by the UE through the USU #1. Accordingly, beam indication related control from the base station by the beam correspondence may be possible. For example, in the aforementioned method, etc., when a base station indicates a beam using a DL RS, a UE may determine an associated UL transmission beam using a beam in which the DL RS is received, and may perform UL transmission through associated USU, and vice versa.

For another example, a case where a DSU associated with a specific USU #2 is not present may occur. In relation to this case, a UE may report, to a base station, information related to a configuration (e.g., panel configuration) of its own transmission unit and/or reception unit in a UE capability information form. In this case, the UE may perform an individual UL beam management and/or beam control procedure, etc. through an initial access process, etc. per se using the USU #2. Furthermore, when initiating UL transmission (e.g., an SRS transmission) to which specific UL beam sweeping from the USU #2 is applied, the base station may configure and/or indicate, for the UE, a specific DL RS received through another specific DSU (or SU) (e.g., a cross SU (beam) association proposal method). UL beam sweeping described in the present disclosure may be configured and/or indicated based on a specific DL RS configured and/or indicated as described above.

For yet another example, a case where a USU associated with a specific DSU #2 is not present may occur. In relation to this case, a UE may report, to a base station, information related to a configuration (e.g., panel configuration) of its own transmission unit and/or reception unit in a UE capability information form. In this case, the UE may perform an individual UL beam management and/or beam control procedure, etc. through a DL reception and/or DL BM process, etc. per se using the DSU #2. Furthermore, in order to control an operation related to specific DL reception from the DSU #2, the base station may configure and/or indicate, for the UE, a specific DL RS transmitted through another specific USU (or SU) (e.g., a cross SU (beam) association proposal method). DL reception beam generation described in the present disclosure and a DL reception process using the same may be configured and/or indicated based on a specific UL RS configured and/or indicated as described above.

FIG. 22 illustrates an operational flowchart of a UE which transmits an SRS in a wireless communication system to which a method proposed in the present disclosure may be applied. FIG. 22 is merely for convenience of description, and does not restrict the scope of the present disclosure.

Referring to FIG. 22, a transmission unit may include the (UL) panel, the uplink synchronization unit (USU), the uplink transmission unit (UTU), etc. described in the present disclosure. Furthermore, a reception unit may include a (DL) panel, a downlink synchronization unit (DSU), a downlink transmission unit (DTU), etc. which are used in the present disclosure.

The UE may receive SRS configuration information (from a base station, etc.) configured in a transmission unit for uplink transmission (S2205). In this case, the SRS configuration information may include configuration information for a reception unit for downlink reception associated with a specific transmission unit. For example, the SRS configuration information may include the panel pair link configuration information described with reference to the third embodiment.

For example, an operation for the UE (e.g., 2420 of FIG. 24, 2520 of FIG. 25) to receive the SRS configuration information from a base station (e.g., 2410 of FIG. 24 or 2510 of FIG. 25) at step S2205 may be implemented by an apparatus of FIGS. 24 and 25 to be described hereinafter. For example, referring to FIG. 24, one or more processors 2421 may control one or more transceivers 2423 and/or one or more memories 2422 to receive the configuration information. The one or more transceivers 2423 may receive the SRS configuration information from the base station.

The UE may transmit an SRS (to the base station, etc.) through a specific transmission unit determined based on the SRS configuration information (S2210). In this case, the SRS may have been configured for beam management usage. For example, the UE may transmit at least one SRS through a specific transmission unit (e.g., a USU or a panel) mapped to a specific SRS resource set based on SRS configuration information configured by the base station. That is, the UE may perform the (local) UL beam sweeping operation, described in the present disclosure, using a specific transmission unit configured and/or indicated by the base station.

For example, an operation for the UE (e.g., 2420 of FIG. 24 or 2520 of FIG. 25) to transmit the SRS to the base station (e.g., 2410 of FIG. 24 or 2510 of FIG. 25) at step S2210 may be implemented by the apparatus of FIGS. 24 and 25 to be described hereinafter. For example, referring to FIG. 24, the one or more processors 2421 may control the one or more transceivers 2423 and/or the one or more memories 2422, etc. to transmit the SRS. The one or more transceivers 2423 may transmit the SRS to the base station.

Furthermore, as described above in the present disclosure, the SRS configuration information may include identification information (e.g., a USU ID or an (UL) panel ID) for the specific transmission unit and/or identification information (e.g., a DSU ID or a (DL) panel ID) for the reception unit.

Furthermore, as described above in the present disclosure, an SRS resource set within the SRS configuration information is configured for each transmission unit. Identification information of a downlink reference signal may be configured for each SRS resource set. In this case, at least one beam for the transmission of the SRS may be determined based on the identification information of the downlink reference signal.

Furthermore, as described above in the present disclosure, the UE may receive information indicating at least one beam for the transmission of the SRS (from the base station, etc.). In this case, the information indicating the at least one beam may be at least one of a beam identifier, an SRS resource identifier, a channel state information-reference signal (CSI-RS) resource identifier and/or a synchronization signal block (SSB) identifier. In this case, if two beams are configured by the information indicating the at least one beam, the two beams may be the first beam and the last beam configured for the transmission of the SRS, respectively. Through such a method, the UE may be configured and/or indicated with a beam range in which (local) UL beam sweeping will be performed.

Furthermore, as described above in the present disclosure, if the SRS is transmitted through multiple beams and multiple SRS resources, different beams may be applied to contiguous SRS resources of the multiple SRS resources. Furthermore, the multiple SRS resources may include one SRS resource set configured for the specific transmission unit. For example, as in the first embodiment, the UE may be configured to perform SRS transmission by applying different beams to neighbor SRS resources (e.g., an (i=0)-th SRS resource and an (i=1)-th SRS resource) of the configured SRS resources.

FIG. 23 illustrates an operational flowchart of a base station which receives an SRS in a wireless communication system to which a method proposed in the present disclosure may be applied. FIG. 23 is merely for convenience of description, and does not restrict the scope of the present disclosure.

Referring to FIG. 23, a transmission unit may include the (UL) panel, the uplink synchronization unit (USU), the uplink transmission unit (UTU), etc. described in the present disclosure. Furthermore, a reception unit may include a (DL)

panel, a downlink synchronization unit (DSU), a downlink transmission unit (DTU), etc. which are used in the present disclosure.

A base station may transmit SRS configuration information (to a UE) configured in a transmission unit for uplink transmission (S2305). In this case, the SRS configuration information may include configuration information for the reception unit for downlink reception associated with a specific transmission unit. For example, the SRS configuration information may include link configuration information between panels described in the third embodiment.

For example, an operation for a base station (e.g., 2410 of FIG. 24 or 2510 of FIG. 25) to transmit the SRS configuration information to a UE (e.g., 2420 of FIG. 24, 2520 of FIG. 25) at step S2305 may be implemented by the apparatus of FIGS. 24 and 25 to be described hereinafter. For example, referring to FIG. 24, one or more processors 2411 may control one or more transceivers 2413 and/or one or more memories 2412, etc. to transmit the configuration information. The one or more transceivers 2413 may transmit the SRS configuration information to the UE.

The base station may receive the SRS (from the UE) through a specific transmission unit determined based on the SRS configuration information (S2310). In this case, the SRS may have been configured for beam management usage. For example, the base station may receive, from the UE, at least one SRS transmitted through a specific transmission unit (e.g., a USU or a panel) mapped to a specific an SRS resource set based on the SRS configuration information. That is, the UE may be configured and/or indicated to perform the (local) UL beam sweeping operation described in the present disclosure using the specific transmission unit configured and/or indicated by the base station.

For example, an operation for the base station (e.g., 2410 of FIG. 24 or 2510 of FIG. 25) to receive the SRS from the UE (e.g., 2420 of FIG. 24, 2520 of FIG. 25) at step S2310 may be implemented by the apparatus of FIGS. 24 and 25 to be described hereinafter. For example, referring to FIG. 24, the one or more processors 2411 may control the one or more transceivers 2413 and/or the one or more memories 2412, etc. to receive the SRS. The one or more transceivers 2413 may receive the SRS from the UE.

Furthermore, as described above in the present disclosure, the SRS configuration information may include identification information (e.g., a USU ID or an (UL) panel ID) for the specific transmission unit and/or identification information (e.g., a DSU ID or a (DL) panel ID) for the reception unit.

Furthermore, as described above in the present disclosure, an SRS resource set within the SRS configuration information may be configured for each transmission unit. Identification information of a downlink reference signal may be configured for each SRS resource set. In this case, at least one beam for the transmission of the SRS may be determined based on the identification information of the downlink reference signal.

Furthermore, as described above in the present disclosure, the base station may transmit information indicating at least one beam for the transmission of the SRS (to the UE). In this case, the information indicating the at least one beam may be at least one of a beam identifier, an SRS resource identifier, a channel state information-reference signal (CSI-RS) resource identifier and/or a synchronization signal block (SSB) identifier. In this case, if two beams are configured by the information indicating the at least one beam, the two beams may be the first beam and the last beam configured for the transmission of the SRS, respectively. Through such a method, the UE may be configured and/or indicated with a beam range in which (local) UL beam sweeping will be performed.

Furthermore, as described above in the present disclosure, if the SRS is transmitted through multiple beams and multiple SRS resources, different beams may be applied to contiguous SRS resources of the multiple SRS resources. Furthermore, the multiple SRS resources may include one SRS resource set configured for the specific transmission unit. For example, as in the first embodiment, the UE may be configured to perform SRS transmission by applying different beams to neighboring SRS resources (e.g., an (i=0)-th SRS resource and an (i=1)-th SRS resource) of configured SRS resources.

General Apparatus to which the Present Disclosure May be Applied

FIG. 24 illustrates a wireless communication apparatus to which methods proposed in the present disclosure may be applied according to another embodiment of the present disclosure.

Referring to FIG. 24, a wireless communication system may include a first device 2410 and multiple second devices 2420 positioned within the area of the first device 2410.

In one embodiment, the first device 2410 may be a base station and the second device 2420 may be a UE. Each of the first device and the second device may be represented as a wireless device.

The base station 2410 includes the processor 2411, the memory 2412, and the transceiver 2413. The processor 2411 implements functions, processes, and/or methods proposed in FIGS. 1 to 23. Layers of wired/wireless interface protocol may be implemented by the processor 2411. The memory 2412 is connected to the processor 2411 and stores various types of information for driving the processor 2411. The transceiver 2413 is connected to the processor 2411 and transmits and/or receives wired/wireless signals. Specifically, the transceiver 2413 may include a transmitter that transmits radio signals and a receiver that receives radio signals.

The UE 2420 includes the processor 2421, the memory 2422, and the transceiver 2423.

The processor 2421 implements functions, processes, and/or methods proposed in FIGS. 1 to 23. Layers of a radio interface protocol may be implemented by the processor 2421. The memory 2422 is connected to the processor 2421 and stores various types of information for driving the processor 2421. The transceiver 2423 is connected to the processor 2421 and transmits and/or receives a radio signal. Specifically, the transceiver 2423 may include a transmitter that transmits radio signals and a receiver that receives radio signals.

The memories 2412 and 2422 may be inside or outside the processors 2411 and 2421, respectively, and may be connected to the processors 2411 and 2421, respectively, through various well-known means.

Further, the base station 2410 and/or the UE 2420 may have a single antenna or multiple antennas.

The first device 2410 and the second device 2420 according to another embodiment will be described.

The first device 2410 may be a base station, a network node, a transmitting terminal, a receiving terminal, a wireless device, a wireless communication device, a vehicle, a vehicle equipped with an autonomous driving function, a connected car, a unmanned aerial vehicle (UAV), an artificial intelligence (AI) module, a robot, an augmented reality (AR) device, a virtual reality (VR) device, a mixed reality (MR) device, a hologram device, a public safety device, a MTC device, an IoT device, a medical device, a Fintech device (or financial device), a security device, a climate/environmental device, devices related to 5G services, or other devices related to the fourth industrial revolution field.

The second device 2420 may be a base station, a network node, a transmitting terminal, a receiving terminal, a wireless device, a wireless communication device, a vehicle, a vehicle equipped with an autonomous driving function, a connected car, a unmanned aerial vehicle (UAV), an artificial intelligence (AI) module, a robot, an augmented reality (AR) device, a virtual reality (VR) device, a mixed reality (MR) device, a hologram device, a public safety device, a MTC device, an IoT device, a medical device, a Fintech device (or financial device), a security device, a climate/environmental device, devices related to 5G services, or other devices related to the fourth industrial revolution field.

For example, the UE may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), etc. For example, the HMD may be a display device worn on a head. For example, an HMD may be used to implement the VR, AR, or MR.

For example, the UAV may be a flying object that is not ridden by people but that flies by radio control signals. For example, the VR device may include a device that implements an object or background in a virtual world. For example, the AR device may include a device that connects and implements the object or background in the real world to the object or background in a real world. For example, the MR device may include a device that fuses and implements the object or background in the virtual world with the object or background in the real world. For example, the hologram device may include a device for implementing a 360-degree stereoscopic image by recording and reproducing stereoscopic information by utilizing a phenomenon of interference of light generated by the two laser lights meeting with each other, called holography. For example, the public safety device may include a video relay device or a video device that may be worn by a body of a user. For example, the MTC device and the IoT device may be a device which does not require direct human intervention or manipulation. For example, the MTC device and the IoT device may include a smart meter, a vending machine, a thermometer, a smart bulb, a door lock, or various sensors. For example, the medical device may be a device used for diagnosing, treating, alleviating, treating, or preventing a disease. For example, the medical device may be a device used for diagnosing, treating, alleviating, or correcting an injury or disability. For example, the medical device may be a device used for inspecting, replacing, or modifying a structure or function. For example, the medical device may be a device used for controlling pregnancy. For example, the medical device may include a medical treatment device, a surgical device, an (in vitro) diagnostic device, a hearing aid or a (medical) procedure device, and the like. For example, the security device may be a device installed to prevent a risk that may occur and to maintain safety. For example, the security device may be a camera, a CCTV, a recorder, or a black box. For example, the Fintech device may be a device capable of providing financial services such as mobile payment. For example, the Fintech device may include a payment device or a point of sales (POS). For example, the climate/environmental device may include a device for monitoring or predicting a climate/environment.

The first device 2410 may include at least one processor, such as the processor 2411, at least one memory, such as the memory 2412, and at least one transceiver, such as the transceiver 2413. The processor 2411 may perform the functions, procedures, and/or methods described above. The processor 2411 may perform one or more protocols. The processor 2411 may perform one or more layers of a radio interface protocol. The memory 2412 may be connected to the processor 2411 and store various types of information and/or commands. The transceiver 2413 may be connected to the processor 2411 and controlled to transmit/receive a radio signal.

The second device 2420 may include at least one processor, such as the processor 2421, at least one memory, such as the memory 2422, and at least one transceiver, such as the transceiver 2423. The processor 2421 may perform the functions, procedures, and/or methods described above. The processor 2421 may implement one or more protocols. For example, the processor 2421 may implement one or more layers of the radio interface protocol. The memory 2422 may be connected to the processor 2421 and store various types of information and/or commands. The transceiver 2423 may be connected to the processor 2421 and controlled to transmit/receive a radio signal.

The memory 2412 and/or the memory 2422 may be each connected inside or outside the processor 2411 and/or the processor 2421 and connected to other processors through various techniques such as wired or wireless connection.

The first device 2410 and/or the second device 2420 may have one or more antennas. For example, an antenna 2414 and/or an antenna 2424 may be configured to transmit and receive the radio signal.

FIG. 25 illustrates another example of the block diagram of the wireless communication device to which a method proposed in the present disclosure may be applied.

Referring to FIG. 25, a wireless communication system includes an eNB 2510 and multiple user equipments 2520 positioned within an area of the eNB. The eNB may be represented by a transmitting apparatus and the UE may be represented by a receiving apparatus, or vice versa. The eNB and the UE include processors 2511 and 2521, memories 2514 and 2524, one or more Tx/Rx radio frequency (RF) modules 2515 and 2525, Tx processors 2512 and 2522, Rx processors 2513 and 2523, and antennas 2516 and 2526, respectively. The processor implements a function, a process, and/or a method which are described above. More specifically, a higher layer packet from a core network is provided to the processor 2511 in DL (communication from the eNB to the UE). The processor implements a function of an L2 layer. In the DL, the processor provides multiplexing between a logical channel and a transmission channel and allocation of radio resources to the UE 2520, and takes charge of signaling to the UE. The transmit (TX) processor 2512 implement various signal processing functions for an L1 layer (i.e., physical layer). The signal processing functions facilitate forward error correction (FEC) at the UE and include coding and interleaving. Encoded and modulated symbols are divided into parallel streams, each stream is mapped to an OFDM subcarrier, multiplexed with a reference signal (RS) in a time and/or frequency domain, and combined together by using inverse fast Fourier transform (IFFT) to create a physical channel carrying a time domain OFDMA symbol stream. An OFDM stream is spatially precoded in order to create multiple spatial streams. Respective spatial streams may be provided to different antennas

2516 via individual Tx/Rx modules (or transceivers, 2515). Each Tx/Rx module may modulate an RF carrier into each spatial stream for transmission. In the UE, each Tx/Rx module (or transceiver, 2525) receives a signal through each antenna 2526 of each Tx/Rx module. Each Tx/Rx module reconstructs information modulated with the RF carrier and provides the reconstructed information to the receive (RX) processor 2523. The RX processor implements various signal processing functions of layer 1. The RX processor may perform spatial processing on information in order to reconstruct an arbitrary spatial stream which is directed for the UE. When multiple spatial streams are directed to the UE, the multiple spatial streams may be combined into a single OFDMA symbol stream by multiple RX processors. The RX processor transforms the OFDMA symbol stream from the time domain to the frequency domain by using a fast Fourier transform (FFT). A frequency domain signal includes individual OFDMA symbol streams for respective subcarriers of the OFDM signal. Symbols on the respective subcarriers and the reference signal are reconstructed and demodulated by determining most likely signal arrangement points transmitted by the eNB. The soft decisions may be based on channel estimation values. The soft decisions are decoded and deinterleaved to reconstruct data and control signals originally transmitted by the eNB on the physical channel. The corresponding data and control signals are provided to the processor 2521.

UL (communication from the UE to the eNB) is processed by the eNB 2510 in a scheme similar to a scheme described in association with a receiver function in the UE 2520. Each Tx/Rx module 2525 receives a signal through each antenna 2526. Each Tx/Rx module provides an RF carrier and information to the RX processor 2523. The processor 2521 may be associated with the memory 2524 storing a program code and data. The memory may be referred to as a computer-readable medium.

In the present disclosure, a wireless device may be a base station, a network node, a transmitter UE, a receiver UE, a radio device, a wireless communication device, a vehicle, a vehicle with an automatic driving function, a drone (unmanned aerial vehicle (UAV)), an artificial intelligence (AI) module, a robot, an augmented reality (AR) device, a virtual reality (VR) device, a MTC device, an IoT device, a medical device, a FinTech device (or financial device), a security device, a climate/environment device, a device related to 5G services or a device related to the fourth industrial revolution field, or the like. For example, the drone may be a flight vehicle that flies by a radio control signal without a person being on the flight vehicle. For example, the MTC device and the IoT device may be a device that does not require a person's direct intervention or manipulation. For example, the MTC device and the IoT device may include a smart meter, a vending machine, a thermometer, a smart bulb, a door lock, a variety of sensors, or the like. For example, the medical device may be a device used for the purpose of diagnosing, treating, alleviating, handling or preventing a disease or a device used for the purpose of testing, substituting or modifying a structure or a function. For example, the medical device may include a medical device, a surgical device, a (in vitro) diagnostic device, a hearing aid or a device for a surgical procedure, and the like. For example, the security device may be a device installed to prevent a possible danger and to maintain safety. For example, the security device may include a camera, CCTV, a recorder, or a black box, and the like. For example, the FinTech device may be a device capable of providing financial services, such as mobile payment. For example, the FinTech device may include a payment device, point of sales (POS), or the like. For example, the climate/environment device may include a device for monitoring and predicting the climate/environment.

In the present disclosure, the UE may include a cellular phone, a smart phone, a laptop computer, a digital broadcast terminal, a personal digital assistant (PDA), a portable multimedia player (PMP), a navigator, a slate PC, a tablet PC, an ultrabook, a wearable device (e.g., a smart watch, a smart glass, a head mounted display (HMD)), foldable device or the like. For example, the HMD may be a display device which is worn on the head and may be used to implement the VR or AR.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and may implement embodiments of the disclosure. The order of operations described in embodiments of the disclosure may be changed. Some components or features of one embodiment may be included in another embodiment, or may be replaced by corresponding components or features of another embodiment. It is apparent that some claims referring to a specific claim may be combined with another claim referring to the claims other than the specific claim to constitute the embodiment or add new claims by means of amendment after the application is filed.

Embodiments of the disclosure may be implemented by various means, for example, hardware, firmware, software, or combinations thereof. When embodiments are implemented by hardware, one embodiment of the disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the disclosure may be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL APPLICABILITY

Although a method for performing an uplink transmission in a wireless communication system of the present disclosure has been described with reference to an example applied to a 3GPP LTE/LTE-A system or a 5G system (New RAT system), the method may be applied to various wireless communication systems in addition to the 3GPP LTE/LTE-A system or 5G system.

The invention claimed is:

1. A method performed by a user equipment in a wireless communication system, the method comprising:
   receiving, from a base station, sounding reference signal (SRS) configuration information that identifies at least one transmission unit of a plurality of transmission units of the user equipment to be used to transmit a SRS for beam management,
   wherein the plurality of transmission units are separated by a distance such that each of the plurality of transmission units are configurable by transmission unit specific SRS configuration parameters; and
   based on the SRS configuration information, transmitting the SRS to the base station through the at least one transmission unit,
   wherein the SRS configuration information also identifies a reception unit of a plurality of reception units of the user equipment to be used for downlink reception,
   wherein the plurality of reception units are respectively associated with the plurality of transmission units, and
   wherein the reception unit is associated with the at least one transmission unit.

2. The method of claim 1,
   wherein a plurality of SRS resource sets within the SRS configuration information is configured for the plurality of transmission units of the user equipment, respectively, and
   wherein identification information of a downlink reference signal is configured for each of the plurality of SRS resource sets.

3. The method of claim 2,
   wherein at least one beam for the transmission of the SRS is determined based on the identification information of the downlink reference signal.

4. The method of claim 1,
   wherein the SRS configuration information further identifies at least one beam of the at least one transmission unit to be used to transmit the SRS, and
   wherein the at least one beam is identified by at least one of a beam identifier, an SRS resource identifier, a channel state information-reference signal (CSI-RS) resource identifier or a synchronization signal block (SSB) identifier.

5. The method of claim 4,
   wherein when the at least one beam identified by the SRS configuration information comprises two beams, the two beams are a first beam and a last beam configured for the transmission of the SRS, respectively.

6. The method of claim 4,
   wherein when the at least one beam identified by the SRS configuration information comprises multiple beams associated with multiple SRS resources, different beams of the multiple beams are applied to contiguous SRS resources among the multiple SRS resources.

7. The method of claim 6,
   wherein the multiple SRS resources are included in one SRS resource set configured by the SRS configuration information for the at least one transmission unit.

8. A user equipment in a wireless communication system, the user equipment comprising:
   a radio frequency (RF) module including a transceiver;
   at least one processor; and
   at least one computer memory operatively coupled to the at least one processor and configured to store instructions performing operations when executed by the at least one processor,
   wherein the operations comprises:
   receiving, from a base station, sounding reference signal (SRS) configuration information that identifies at least one transmission unit of a plurality of transmission units of the user equipment to be used to transmit a SRS for beam management,
   wherein the plurality of transmission units are separated by a distance such that each of the plurality of transmission units are configurable by transmission unit specific SRS configuration parameters, and
   based on the SRS configuration information, transmitting the SRS to the base station through the at least one transmission unit,
   wherein the SRS configuration information also identifies a reception unit of a plurality of reception units of the user equipment to be used for downlink reception,
   wherein the plurality of reception units are respectively associated with the plurality of transmission units, and
   wherein the reception unit is associated with the at least one transmission unit.

9. The user equipment of claim 8,
   wherein a plurality of SRS resource sets within the SRS configuration information is configured for the plurality of transmission units of the user equipment, respectively, and
   wherein identification information of a downlink reference signal is configured for each of the plurality of SRS resource sets.

10. The user equipment of claim 9,
    wherein at least one beam for the transmission of the SRS is determined based on the identification information of the downlink reference signal.

11. The user equipment of claim 8,
    wherein the SRS configuration information further identifies at least one beam of the at least one transmission unit to be used to transmit the SRS, and
    wherein the at least one beam is identified by at least one of a beam identifier, an SRS resource identifier, a channel state information-reference signal (CSI-RS) resource identifier or a synchronization signal block (SSB) identifier.

12. The user equipment of claim 11,
    wherein when the at least one beam identified by the SRS configuration information comprises two beams, the two beams are a first beam and a last beam configured for the transmission of the SRS, respectively.

13. The user equipment of claim 11,
    wherein when the at least one beam identified by the SRS configuration information comprises multiple beams associated with multiple SRS resources, different beams of the multiple beams are applied to contiguous SRS resources among the multiple SRS resources, and
    wherein the multiple SRS resources are included in one SRS resource set configured by the SRS configuration information for the at least one transmission unit.

* * * * *